(12) United States Patent
Woo

(10) Patent No.: US 11,959,595 B2
(45) Date of Patent: Apr. 16, 2024

(54) APPARATUS FOR FIXING PRESSURE VESSEL

(71) Applicant: HYUNDAI MOBIS CO., LTD., Seoul (KR)

(72) Inventor: Myeong Nam Woo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 369 days.

(21) Appl. No.: 17/466,190

(22) Filed: Sep. 3, 2021

(65) Prior Publication Data

US 2022/0082212 A1  Mar. 17, 2022

(30) Foreign Application Priority Data

Sep. 15, 2020 (KR) .................... 10-2020-0118637
Sep. 15, 2020 (KR) .................... 10-2020-0118638
Oct. 26, 2020 (KR) .................... 10-2020-0139711

(51) Int. Cl.
*F17C 13/08* (2006.01)
*B60K 15/07* (2006.01)
*F16M 11/22* (2006.01)

(52) U.S. Cl.
CPC ........... *F17C 13/084* (2013.01); *F16M 11/22* (2013.01); *B60K 15/07* (2013.01); *F17C 2201/0109* (2013.01); *F17C 2205/0107* (2013.01); *F17C 2221/012* (2013.01); *F17C 2270/0184* (2013.01)

(58) Field of Classification Search
CPC ........ F17C 1/02; F17C 13/083; F17C 13/084; F17C 2201/0109; F17C 2205/0103; F17C 2205/0107; F17C 2205/0111; F17C 2205/0115; F17C 2205/0119; F17C 2221/012; F17C 2270/0168; F16M 11/22; E02F 9/0883; B65D 88/123; B65D 88/128; B65D 88/129; B65D 90/12; B65D 90/20; B63C 2011/024; B63C 2011/025; B60P 7/12; B60K 15/07; A62C 13/78; A62B 25/00; A62B 25/005
USPC ..... 220/4.14, 4.15, 562, 563, 564, 582, 668; 211/85.8, 85.18
See application file for complete search history.

(56) References Cited

U.S. PATENT DOCUMENTS

| 4,593,832 | A | * | 6/1986 | Gerhard | .............. | B65D 88/128 220/628 |
| 4,665,956 | A | * | 5/1987 | Freeman | .............. | B65D 88/128 141/98 |
| 5,390,806 | A | * | 2/1995 | Elston | .................. | B65D 88/128 220/1.5 |
| 6,012,598 | A | * | 1/2000 | Antoniou | .............. | F17C 13/084 220/668 |
| 6,508,477 | B2 | * | 1/2003 | Burkett | ................. | F17C 13/085 248/346.11 |

(Continued)

FOREIGN PATENT DOCUMENTS

| EP | 3064451 A1 | * | 9/2016 | .......... | A47B 81/007 |
| JP | 2003127675 A | * | 5/2003 | ............ | F17C 13/084 |

(Continued)

*Primary Examiner* — Joshua E Rodden
(74) *Attorney, Agent, or Firm* — NSIP Law

(57) ABSTRACT

An apparatus for fixing a pressure vessel to an object includes: a frame member configured to be fixed to the object; a first locking part configured to lock one axial end of the pressure vessel to the frame member; and a second locking part configured to lock another axial end of the pressure vessel to the frame member.

15 Claims, 22 Drawing Sheets

(56) References Cited

U.S. PATENT DOCUMENTS

| | | | | |
|---|---|---|---|---|
| 8,381,937 | B2* | 2/2013 | Schmidt | B60P 3/221 |
| | | | | 220/920 |
| 8,590,720 | B2* | 11/2013 | Thomas, II | B65D 88/128 |
| | | | | 220/23.91 |
| 9,499,145 | B2* | 11/2016 | Moulik | B60G 17/0523 |
| 10,081,243 | B2* | 9/2018 | Zimmerman | B60K 15/07 |
| 10,670,191 | B2* | 6/2020 | Yeggy | F17C 13/083 |
| 11,312,229 | B1* | 4/2022 | Yordanov | B32B 27/304 |
| 2002/0134793 | A1* | 9/2002 | Coleman | B65D 88/60 |
| | | | | 222/386 |
| 2009/0134171 | A1* | 5/2009 | deBerardinis | B65D 90/24 |
| | | | | 220/23.91 |
| 2012/0174371 | A1* | 7/2012 | Koehnen | B25B 5/147 |
| | | | | 29/428 |
| 2015/0122821 | A1* | 5/2015 | Nettis | F17C 1/002 |
| | | | | 220/560.11 |
| 2016/0114202 | A1* | 4/2016 | Copeland | A62C 13/78 |
| | | | | 169/51 |
| 2017/0043945 | A1* | 2/2017 | Luo | B65D 90/20 |
| 2017/0334288 | A1* | 11/2017 | Rike | B60K 15/07 |
| 2019/0226641 | A1* | 7/2019 | Ogiwara | F17C 13/12 |
| 2021/0268897 | A1* | 9/2021 | Mair | B60K 15/077 |
| 2022/0194218 | A1* | 6/2022 | Woo | F17C 13/084 |
| 2022/0243873 | A1* | 8/2022 | Woo | E02F 9/207 |
| 2022/0266685 | A1* | 8/2022 | Godard | F17C 13/084 |

FOREIGN PATENT DOCUMENTS

| | | | | |
|---|---|---|---|---|
| NL | 2010790 C | * | 11/2014 | B65D 88/128 |
| WO | WO-2005080114 A1 | * | 9/2005 | B60K 15/03006 |

* cited by examiner

APPARATUS FOR FIXING PRESSURE VESSEL

CROSS-REFERENCE TO RELATED APPLICATIONS

This application claims the benefit under 35 U.S.C. § 119(a) of Korean Patent Application No. 10-2020-0118637 filed on Sep. 15, 2020 in the Korean Intellectual Property Office, Korean Patent Application No. 10-2020-0118638 filed on Sep. 15, 2020 in the Korean Intellectual Property Office, and Korean Patent Application No. 10-2020-0139711 filed on Oct. 26, 2020 in the Korean Intellectual Property Office, the entire disclosures of which are incorporated herein by reference for all purposes.

TECHNICAL FIELD

The present disclosure relates to an apparatus for fixing a pressure vessel, and more particularly, to an apparatus for fixing a pressure vessel, which may have a simple structure and improve a degree of design freedom and spatial utilization.

BACKGROUND ART

A hydrogen vehicle is configured to produce electricity by means of a chemical reaction between hydrogen and oxygen and to travel by operating a motor. More specifically, the hydrogen vehicle includes a pressure vessel configured to store hydrogen ($H_2$), a fuel cell stack configured to produce electricity by means of an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

A TYPE 4 pressure vessel may be used as the pressure vessel of the hydrogen vehicle. The TYPE 4 pressure vessel may include a liner (e.g., a nonmetallic material), and a carbon fiber layer made by winding a carbon fiber composite material around an outer surface of the liner.

Meanwhile, recently, various attempts have been made to package a fuel cell stack, a pressure vessel (hydrogen tank), a battery, a converter, and the like into a power pack module and mount the power pack module in a hydrogen vehicle.

In particular, recently, various attempts have been made to minimize a size of the power pack module to mount the power pack module in a limited space (e.g., an internal space of the hydrogen vehicle).

However, in the related art, a clamp configured to surround an outer circumferential surface of the pressure vessel is required to fix the pressure vessel, and a space (height) for arranging the clamp needs to be ensured to the extent of a thickness of the clamp disposed on the outer circumferential surface of the pressure vessel, which makes it difficult to minimize an overall height (thickness) of the power pack module in a radial direction of the pressure vessel to a certain degree or more.

Therefore, recently, various studies have been conducted to simplify a structure for fixing a pressure vessel and improve spatial utilization and a degree of design freedom, but the study results are still insufficient. Accordingly, there is a need to develop a technology to simplify a structure for fixing a pressure vessel and improve spatial utilization and a degree of design freedom.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for fixing a pressure vessel to an object includes: a frame member configured to be fixed to the object; a first locking part configured to lock one axial end of the pressure vessel to the frame member; and a second locking part configured to lock another axial end of the pressure vessel to the frame member.

The apparatus of claim 1, wherein the pressure vessel may include: a body part; a first side part disposed at one end of the body part and having a dome shape; and a second side part disposed at another end of the body part and having a dome shape. The first locking part may be configured to lock the first side part to the frame member, and the second locking part is configured to lock the second side part to the frame member.

The first side part may include a tap portion. The first locking part may be configured to lock the tap portion to the frame member.

The first locking part may include: a bracket fixed to the frame member and having a fastening hole corresponding to the tap portion; and a fastening member fastened to the fastening hole and the tap portion.

The apparatus may further include: a first reference hole disposed in the frame member; a first mounting hole disposed in the bracket and corresponding to the first reference hole; a first fixing member fastened to the first reference hole and the first mounting hole; a second reference hole disposed in the frame member and spaced apart from the first reference hole; a second mounting hole provided in the bracket and corresponding to the second reference hole; and a second fixing member fastened to the second reference hole and the second mounting hole.

The first reference hole may have a first length in a radial direction of the pressure vessel. The second reference hole may have a second length in the radial direction that is longer than the first length.

The second locking part may include: a support part configured to support an outer surface of the second side part; and a bracket configured to support the support part on the frame member.

The second locking part may further include: a fastening hole disposed in the bracket; a fastening part disposed on the frame member and having a coupling hole corresponding to the fastening hole; and a fastening member fastened to the fastening hole and the coupling hole.

The second locking part may further include: a guide slot disposed in the frame member in a longitudinal direction of the pressure vessel; and a guide protrusion connected to the bracket and accommodated in the guide slot so as to be rectilinearly movable.

The apparatus may further include an inclined guide portion disposed in an opening portion of the guide slot and configured to guide insertion of the guide protrusion.

The guide slot may have a first width in a radial direction of the pressure vessel. The guide protrusion may have a second width corresponding to the first width.

The guide slot may have a first thickness in an upward/downward direction. The guide protrusion may have a second thickness corresponding to the first thickness.

The apparatus may further include a locking protrusion disposed at an end of the guide protrusion, having a larger cross-sectional area than the guide slot, and disposed on an outer surface of the frame member.

The support part may have a form of a ring that partially surrounds the outer surface of the second side part.

The apparatus may further include an elastic pad interposed between the second side part and the support part.

The apparatus may further include a seating part disposed on the frame member, wherein the pressure vessel is seated on the seating part.

The seating part may include: a first seating rib disposed on the frame member and configured to allow the body part to be seated thereon; and a second seating rib disposed on the frame member, spaced apart from the first seating rib, and configured to allow the body part to be seated thereon.

The first seating rib may include a first seating surface disposed in contact with an outer circumferential surface of the body part. The second seating rib may include a second seating surface disposed in contact with the outer circumferential surface of the body part.

The apparatus may further include: a first seating pad interposed between the body part and the first seating rib; and a second seating pad interposed between the body part and the second seating rib.

Other features and aspects will be apparent from the following detailed description, the drawings, and the claims.

DETAILED DESCRIPTION

Figure 1:
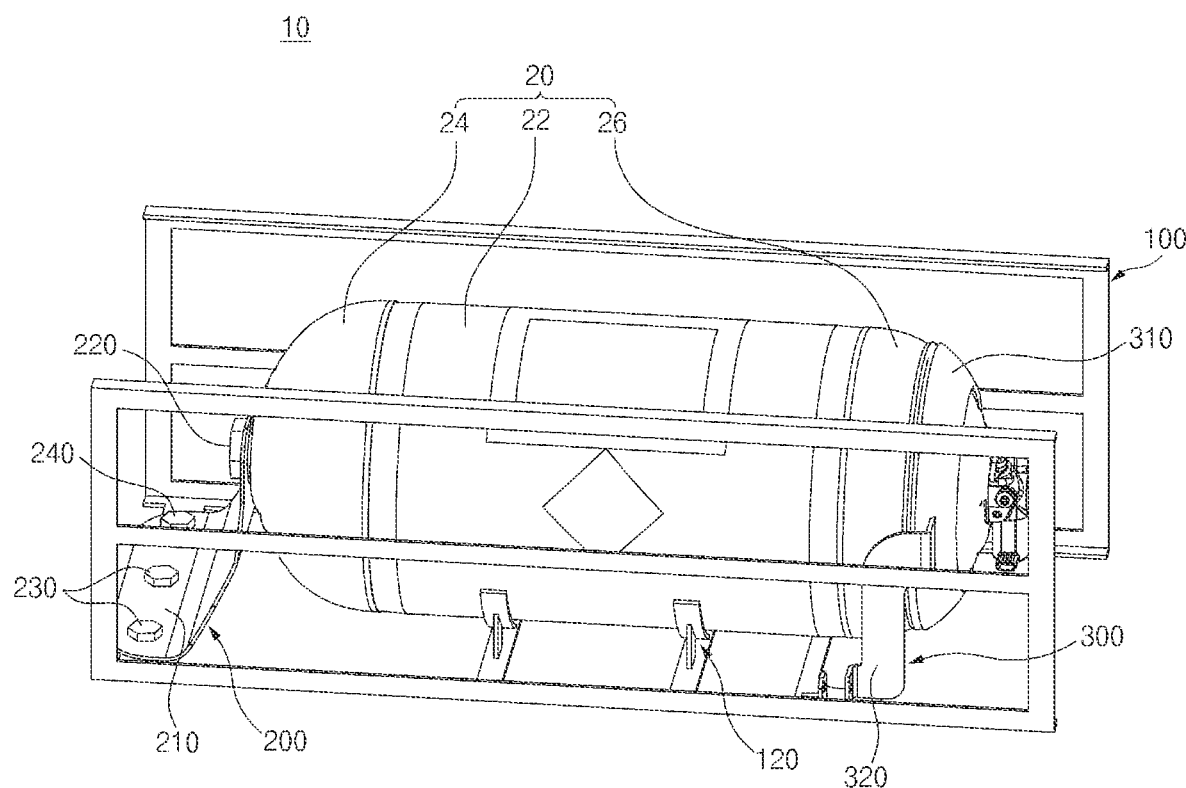
FIG. 1 is an exploded perspective view for explaining an apparatus for fixing a pressure vessel according to a first embodiment of the present disclosure.
Figure 2:
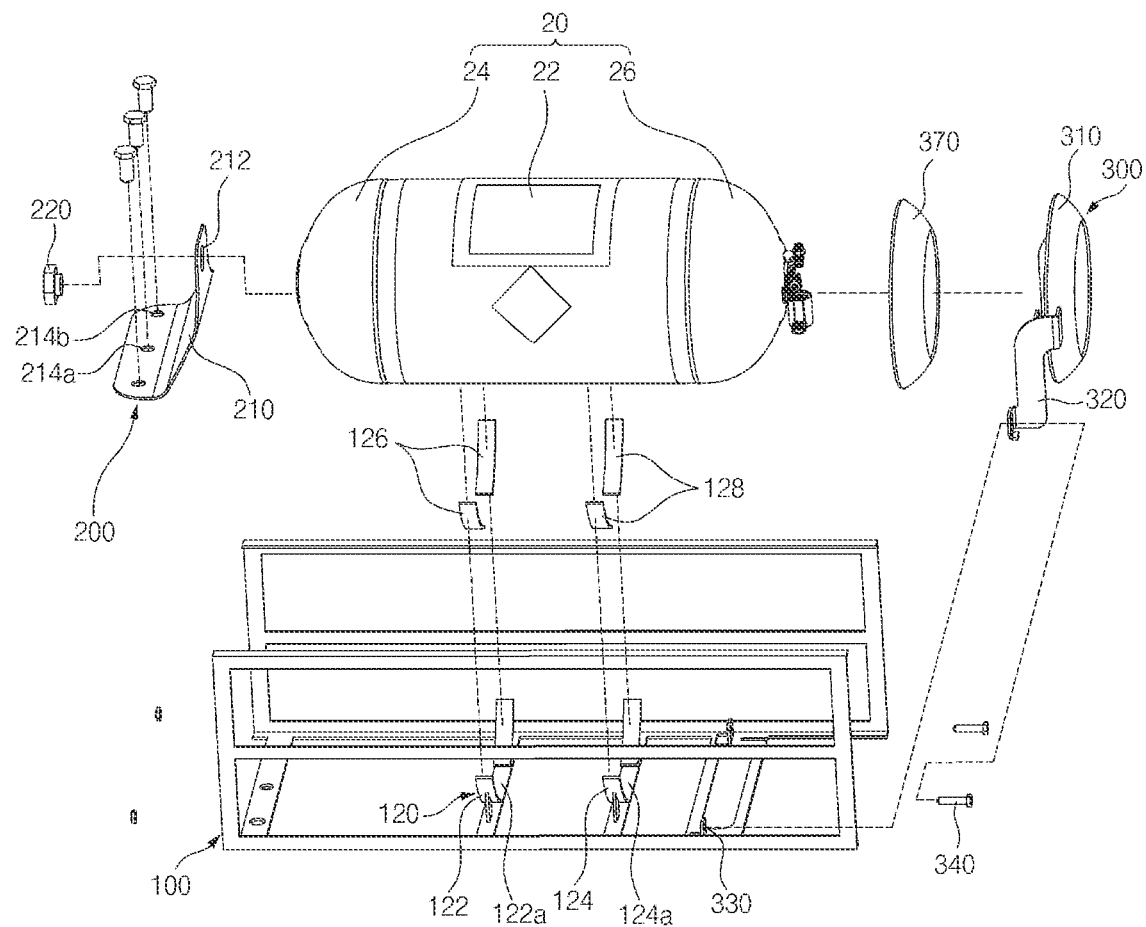
FIG. 2 is a perspective view for explaining the apparatus for fixing a pressure vessel according to the first embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 8, an apparatus 10 for fixing a pressure vessel according to the first embodiment of the present disclosure is configured to fix a pressure vessel 20 to a subject and includes a frame member 100 configured to be fixed to the subject, a first locking part 200 configured to lock one end in an axial direction of the pressure vessel 20 to the frame member 100, and a second locking part 300 configured to lock the other end in the axial direction of the pressure vessel 20 to the frame member 100.

For reference, the apparatus 10 for fixing a pressure vessel according to the first embodiment of the present disclosure may be used to fix the pressure vessel 20 to various subjects. The present disclosure is not restricted or limited by the type and structure of the subject to which the pressure vessel 20 is fixed.

For example, the apparatus 10 for fixing a pressure vessel according to the first embodiment of the present disclosure may be used to fix the pressure vessel 20 in a vehicle (e.g., a passenger vehicle or a commercial vehicle).

The pressure vessel 20 may store high-pressure compressed hydrogen. For example, the pressure vessel 20 may include a liner (not illustrated), a carbon fiber layer (not illustrated) configured to surround an outer surface of the liner, and a fiberglass layer (not illustrated) configured to surround an outer surface of the carbon fiber layer. The pressure vessel 20 may be selectively expanded or contracted depending on a pressure of hydrogen stored in the pressure vessel 20.

Figure 3:
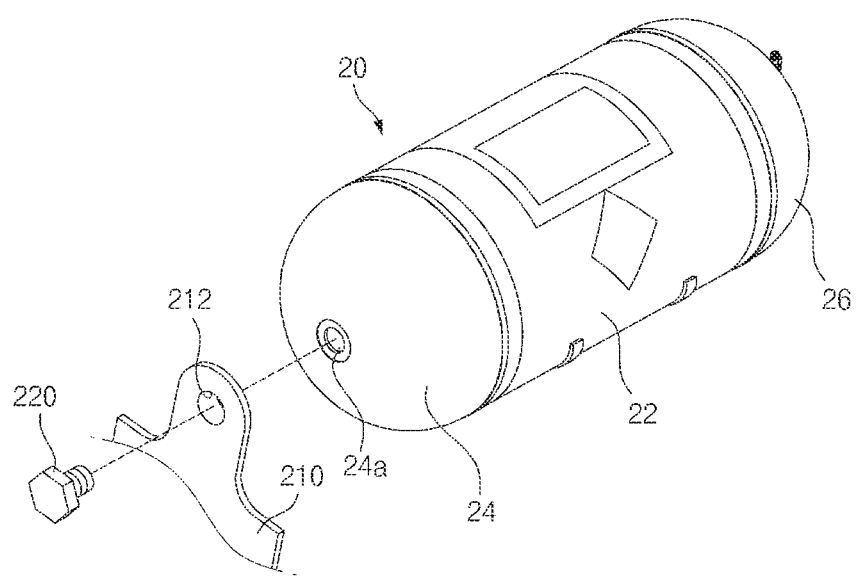
FIG. 3 is a view for explaining a first locking part of the apparatus for fixing a pressure vessel according to the first embodiment of the present disclosure.
Figure 4:
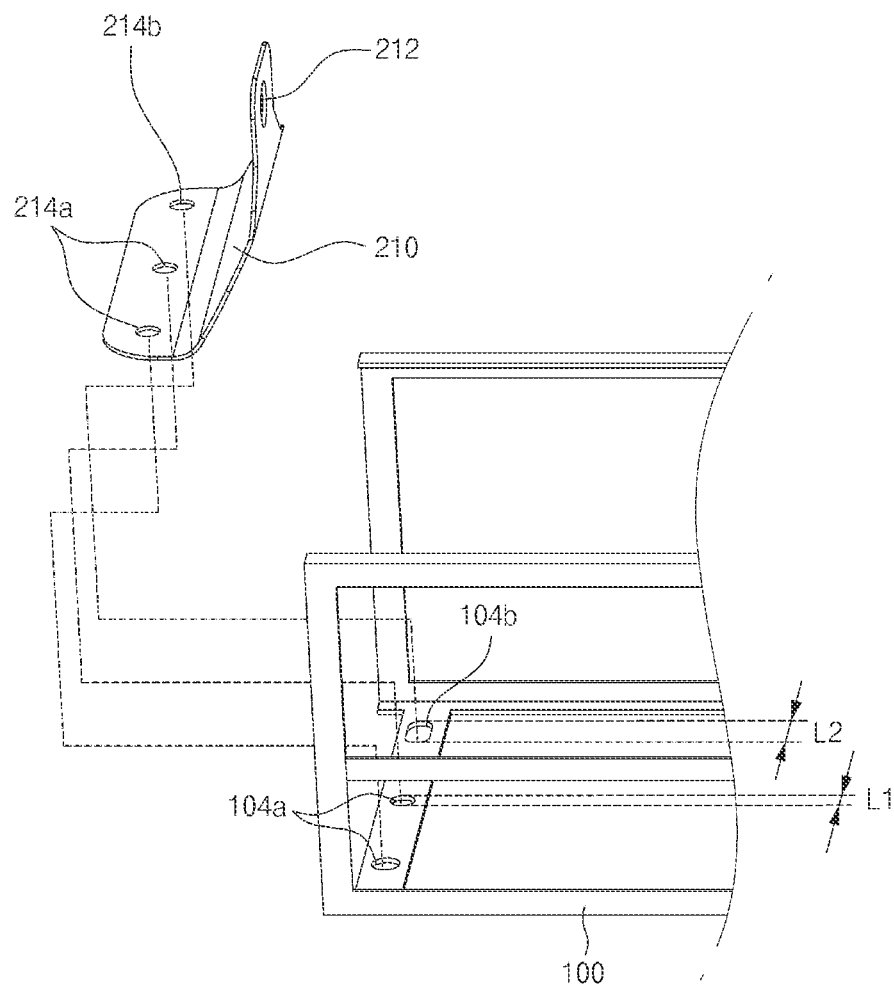
FIG. 4 is a view for explaining a first bracket of the apparatus for fixing a pressure vessel according to the first embodiment of the present disclosure.
Figure 5:
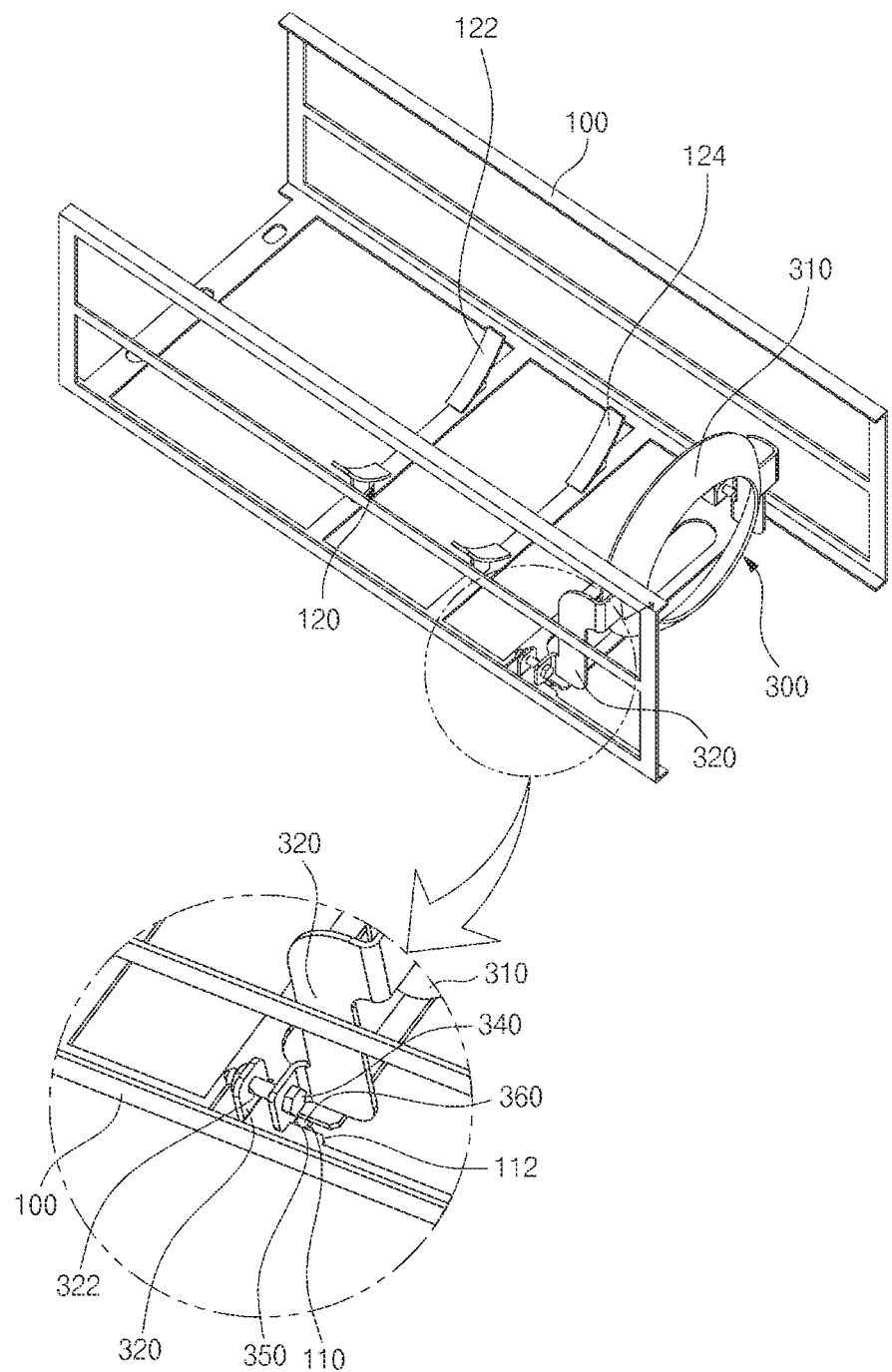
FIG. 5 is a view for explaining a second locking part of the apparatus for fixing a pressure vessel according to the first embodiment of the present disclosure.
Figure 6:
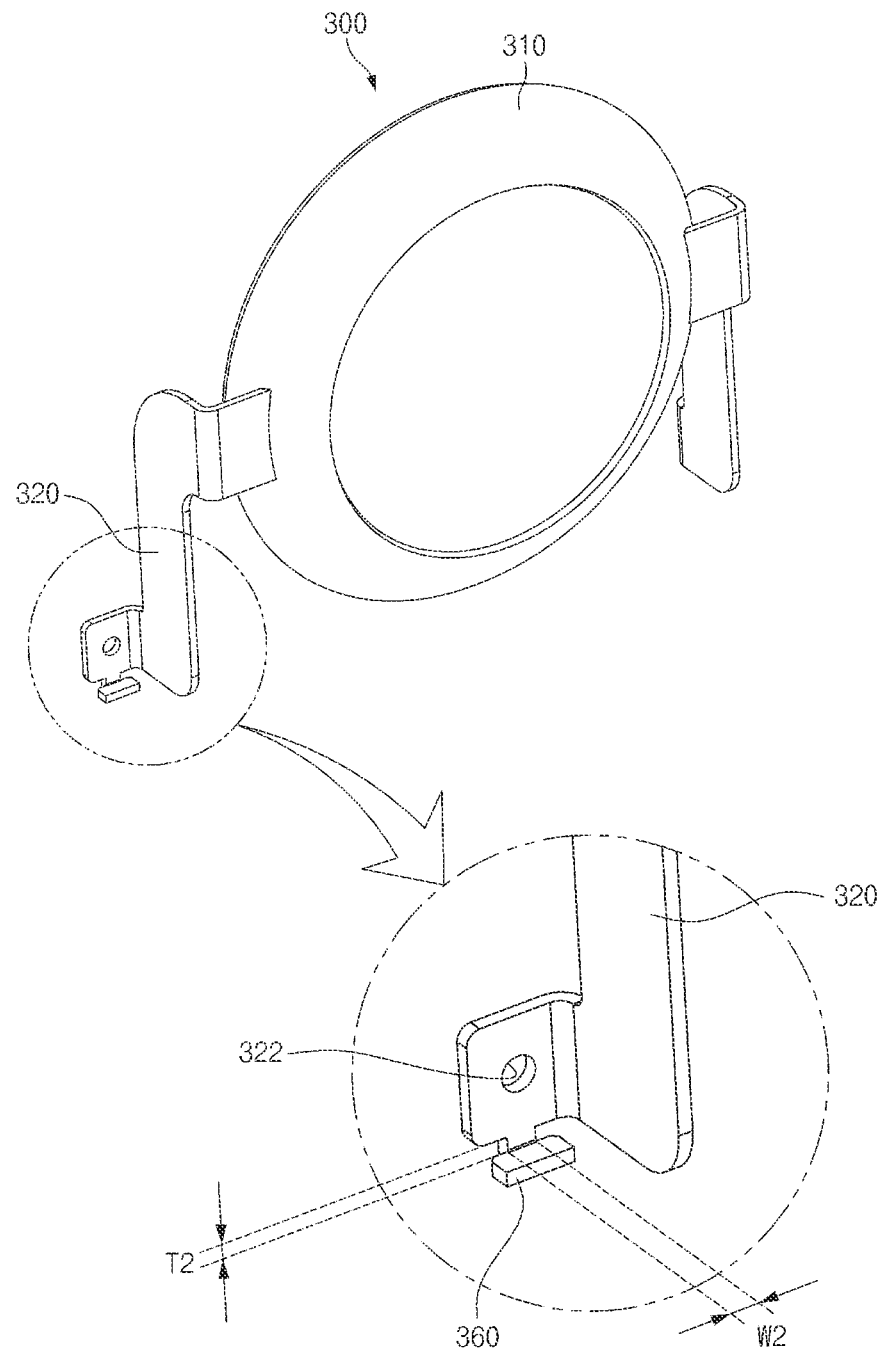
FIG. 6 is a view for explaining a guide protrusion and a locking protrusion of the apparatus for fixing a pressure vessel according to the first embodiment of the present disclosure.
Figure 7:
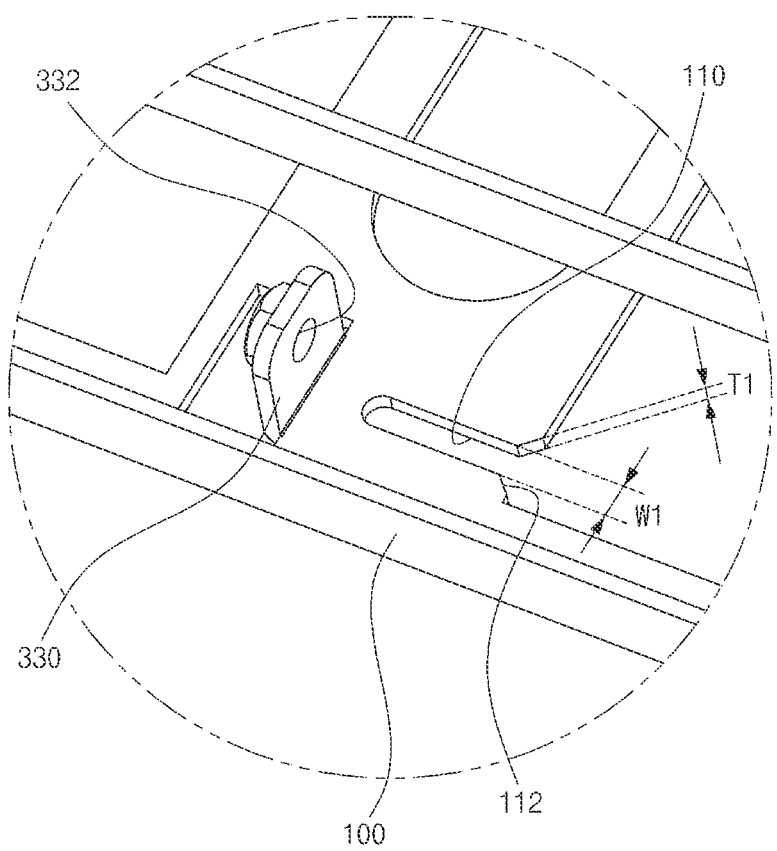
FIG. 7 is a view for explaining a fastening part and a guide slot of the apparatus for fixing a pressure vessel according to the first embodiment of the present disclosure.
Figure 8:
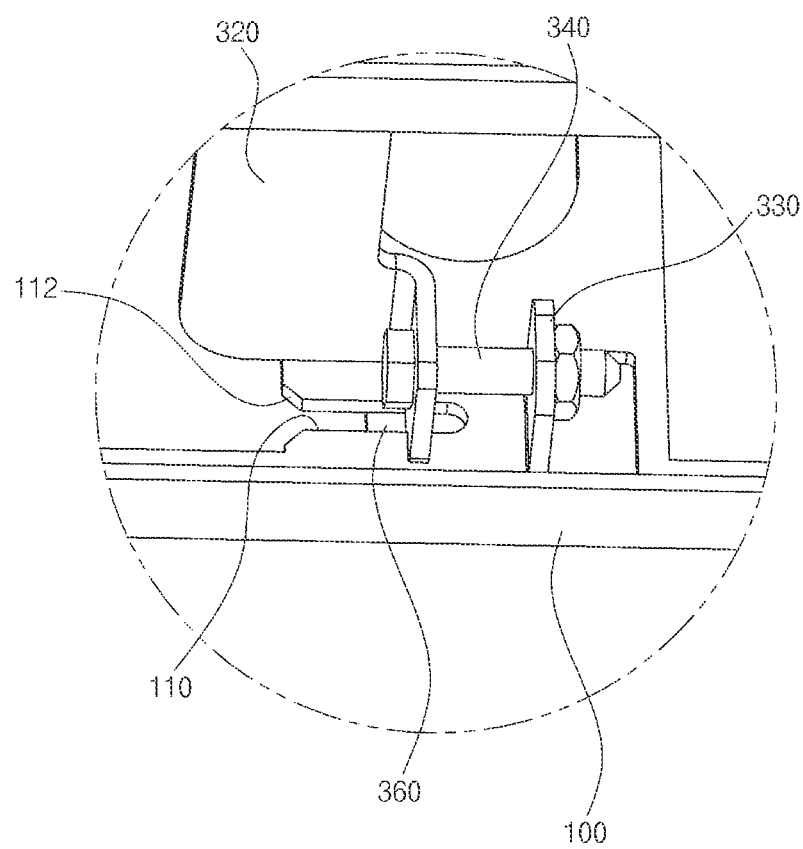
FIG. 8 is a view for explaining a fastening structure of a second fastening member of the apparatus for fixing a pressure vessel according to the first embodiment of the present disclosure.

More specifically, referring to FIG. 3, the pressure vessel 20 may include a body part 22, a first side part 24 disposed at one end (a left end based on FIG. 3) of the body part 22 and having a dome shape, and a second side part 26 disposed at the other end (a right end based on FIG. 3) of the body part 22 and having a dome shape.

For example, the body part 22 may have a hollow cylindrical shape. The first side part 24 and the second side part 26 each have a dome shape and may be integrally connected to two opposite ends of the body part 22.

In addition, a tap portion 24a may be disposed at one end of the pressure vessel 20.

For reference, the tap portion 24a may be used to support (fix) the pressure vessel 20 using a jig or the like during a process of winding the carbon fiber layer and the fiberglass layer around the outer surface of the liner. For example, a screw thread may be formed on an inner circumferential surface of the tap portion 24a by a typical tapping process. The tap portion 24a and the center of the pressure vessel 20 may be disposed on the same line in a longitudinal direction of the pressure vessel 20.

The frame member 100 may be fixed to the subject (e.g., a vehicle body of a vehicle).

The frame member 100 may surround the pressure vessel 20 to protect other components that constitute the pressure vessel 20 and a power pack module (not illustrated). For example, the frame member 100 may be made of a metallic material.

The frame member 100 may be variously changed in structure and shape in accordance with required conditions and design specifications. The present disclosure is not restricted or limited by the structure and shape of the frame member 100.

For example, the frame member 100 may be provided in the form of a quadrangular casing opened in all directions and define an outer peripheral framework of the apparatus 10 for fixing a pressure vessel. The pressure vessel 20 may be accommodated in the frame member 100.

Referring to FIGS. 1 to 4, the first locking part 200 is configured to lock one end (the left end based on FIG. 3) in the axial direction of the pressure vessel 20 to the frame member 100.

In particular, the first locking part 200 locks the first side part 24 to the frame member 100.

Since the first locking part 200 locks the first side part 24 instead of the outer circumferential surface of the body part 22 in the first embodiment of the present disclosure as described above, it is not necessary to additionally ensure a space for arranging the first locking part 200. Therefore, it is possible to obtain an advantageous effect of simplifying the structure and improving the degree of design freedom and spatial utilization.

Among other things, according to the first embodiment of the present disclosure, it is not necessary to ensure a space (height) for arranging the first locking part 200 on the outer circumferential surface of the body part 22. Therefore, it is possible to reduce an overall height (thickness) of the power pack module in the radial direction of the pressure vessel 20.

The first locking part 200 may have various structures capable of locking the first side part 24 to the frame member 100. The present disclosure is not restricted or limited by the structure of the first locking part 200.

In particular, the first locking part 200 may lock the tap portion 24a, which is disposed on the first side part 24, to the frame member 100.

As described above, the first locking part 200 locks the tap portion 24a, which is provided on the pressure vessel 20 during the process of manufacturing the pressure vessel 20, without additionally providing (forming) a separate fixing hole or fixing structure on the pressure vessel 20 to fix the first locking part 200 to the pressure vessel 20. Therefore, it is possible to obtain an advantageous effect of simplifying the structure and the manufacturing process and reducing the costs.

For example, the first locking part 200 may include a first bracket 210 having a first fastening hole 212 corresponding to the tap portion 24a and fixed to the frame member 100, and a first fastening member 220 fastened to the first fastening hole 212 and the tap portion 24a.

For example, the first bracket 210 may have an approximately "L" shape. One end of the first bracket 210 may be fixed to the frame member 100, and the other end of the first bracket 210 may be disposed adjacent to the tap portion 24a.

The first fastening hole 212 may be provided at the other end of the first bracket 210 and have a diameter corresponding to the tap portion 24a. In particular, the first fastening hole 212 may be disposed coaxially with the tap portion 24a.

A typical fastening member capable of being fastened (e.g., thread-fastened) to the first fastening hole 212 and the tap portion 24a may be used as the first fastening member 220. The present disclosure is not restricted or limited by the type and structure of the first fastening member 220. For example, a typical bolt may be used as the first fastening member 220.

The first bracket 210 and the pressure vessel 20 may be integrally fixed as the first fastening member 220 passes through the first fastening hole 212 and then is fastened to the tap portion 24a.

The structure for fixing the first bracket 210 to the frame member 100 may be variously changed in accordance with required conditions and design specifications.

According to the exemplary embodiment of the present disclosure, the apparatus 10 for fixing a pressure vessel may include first reference holes 104a provided in the frame member 100, first mounting holes 214a provided in the first bracket 210 and corresponding to the first reference holes 104a, first fixing members 230 fastened to the first reference holes 104a and the first mounting holes 214a, a second reference hole 104b provided in the frame member 100 and spaced apart from the first reference holes 104a, a second mounting hole 214b provided in the first bracket 210 and corresponding to the second reference hole 104b, and a second fixing member 240 fastened to the second reference hole 104b and the second mounting hole 214b.

For example, the plurality of first reference holes 104a may be provided in the frame member 100 and spaced apart from one another, and the plurality of first mounting holes 214a may be provided in the first bracket 210 and correspond to the first reference holes 104a. According to another embodiment of the present disclosure, only a single first reference hole may be provided in the frame member, and only a single first mounting hole may be provided in the first bracket.

Typical bolts may be used as the first fixing member 230 and the second fixing member 240. The present disclosure is not restricted or limited by the type and structure of the first fixing member 230 and the second fixing member 240.

For example, the first bracket 210 and the frame member 100 may be integrally fixed as the first fixing member 230 sequentially passes through the first mounting hole 214a and the first reference hole 104a and then is fastened to a nut (not illustrated) disposed on an outer surface (a lower surface based on FIG. 2) of the frame member 100.

Likewise, the first bracket 210 and the frame member 100 may be integrally fixed as the second fixing member 240 sequentially passes through the second mounting hole 214b and the second reference hole 104b and then is fastened to a nut (not illustrated) disposed on the outer surface (the lower surface based on FIG. 2) of the frame member 100.

Since the first bracket 210 is fixed to the frame member 100 by the first fixing member 230 and the second fixing member 240 spaced apart from each other as described above, it is possible to obtain an advantageous effect of inhibiting a rotation of the first bracket 210 relative to the frame member 100 and stably maintaining an arrangement state of the first bracket 210.

According to the exemplary embodiment of the present disclosure, the first reference hole 104a may have a first length L1 in the radial direction of the pressure vessel 20, and the second reference hole 104b may have a second length L2 longer than the first length in the radial direction of the pressure vessel 20.

As described above, according to the first embodiment of the present disclosure, the second reference hole 104b has a longer length (L2>L1) than the first reference hole 104a in the radial direction of the pressure vessel 20. Therefore, it is possible to obtain an advantageous effect of fastening the second fixing member 240 even though the second mounting hole 214b and the second reference hole 104b are not perfectly coincident with each other in the radial direction of the pressure vessel 20 due to manufacturing tolerance or the like in a state in which the first bracket 210 is disposed so that the first reference hole 104a and the first mounting hole 214a are coincident with each other.

In the first embodiment of the present disclosure illustrated and described above, the example has been described in which one end of the first bracket 210 is fixed to the frame member 100 by means of the first fixing member 230 and the second fixing member 240. However, according to another embodiment of the present disclosure, one end of the first bracket may be fixed to the frame member by welding.

Referring to FIGS. 2 and 5 to 8, the second locking part 300 is configured to lock the other end (the right end based on FIG. 2) in the axial direction of the pressure vessel 20 to the frame member 100.

In particular, the second locking part 300 locks the second side part 26 to the frame member 100.

Since the second locking part 300 locks the second side part 26 instead of the outer circumferential surface of the body part 22 as described above, it is not necessary to additionally ensure a space for arranging the second locking part 300. Therefore, it is possible to obtain an advantageous effect of simplifying the structure and improving the degree of design freedom and spatial utilization.

Among other things, according to the first embodiment of the present disclosure, it is not necessary to ensure a space (height) for arranging the second locking part 300 on the outer circumferential surface of the body part 22. Therefore, it is possible to reduce an overall height (thickness) of the power pack module in the radial direction of the pressure vessel 20.

The second locking part 300 may have various structures capable of locking the second side part 26 to the frame member 100. The present disclosure is not restricted or limited by the structure of the second locking part 300.

For example, the second locking part 300 may include a support part 310 configured to support an outer surface of the second side part 26, and second brackets 320 configured to support the support part 310 on the frame member 100.

In particular, the support part 310 may be provided in the form of a hollow ring that partially surrounds the outer surface of the second side part 26. More particularly, the support part 310 may have a dome shape corresponding to the outer surface of the second side part 26 and be in close contact with the outer surface of the second side part 26.

According to another embodiment of the present disclosure, the support part may have an arc shape or other shapes.

The second bracket 320 may have various structures capable of supporting the support part 310 on the frame member 100. The present disclosure is not restricted or limited by the structure of the second bracket 320.

For example, an upper end of the second bracket 320 may be integrally connected (e.g., welded) to a lateral portion of the support part 310, and a lower end of the second bracket 320 may be supported on the frame member 100.

In this case, the configuration in which the lower end of the second bracket 320 is supported on the frame member 100 may be defined as a concept including a case in which the lower end of the second bracket 320 is integrally fixed or coupled to the frame member 100 or separably mounted on the frame member 100.

For reference, since one end of the pressure vessel 20 is integrally fixed to the frame member 100 by means of the first locking part 200, the arrangement state of the pressure vessel 20 implemented by the first locking part 200 and the second locking part 300 may be stably maintained only by supporting the second bracket 320 on the frame member 100 even though the second bracket 320 connected to the support part 310 is not integrally fixed (e.g., by bolting) to the frame member 100.

As described above, according to the first embodiment of the present disclosure, the second locking part 300 is locked to the pressure vessel 20 by the support part 310 being in close contact with the outer surface of the second side part 26 without additionally providing (forming) a separate fixing hole in the pressure vessel 20 to fix the second locking part 300 to the pressure vessel 20. Therefore, it is possible to obtain an advantageous effect of simplifying the structure and the manufacturing process and reducing the costs.

Among other things, according to the first embodiment of the present disclosure, it is not necessary to provide a separate fixing hole for fixing the second locking part 300 to the pressure vessel 20. Therefore, it is possible to obtain an advantageous effect of stably fixing the arrangement state of the pressure vessel 20 without damaging the pressure vessel 20 or degrading the structural rigidity.

Furthermore, according to the first embodiment of the present disclosure, the first locking part 200 and the second locking part 300 lock the first side part 24 and the second side part 26 without locking the outer circumferential surface of the body part 22. The expansion and contraction of the pressure vessel 20 may be guided in all directions (e.g., an upward/downward direction and a leftward/rightward direction) based on the center of the pressure vessel 20 as uniformly as possible (without being deflected). Therefore, it is possible to obtain an advantageous effect of minimizing a movement of the center of the pressure vessel 20 at the time of the expansion and contraction of the pressure vessel 20 and minimizing the distortion of the center of the pressure vessel 20 relative to a component (e.g., a valve or a pipe) connected to the pressure vessel 20. Therefore, it is possible to obtain an advantageous effect of reducing a risk of leakage of hydrogen from connecting portions of the valve and pipe connected to the pressure vessel 20 and improving the safety and reliability.

According to the exemplary embodiment of the present disclosure, the second locking part 300 may include second fastening holes 322 provided in the second brackets 320, and fastening parts 330 disposed on the frame member 100 and each having a coupling hole 332 corresponding to the second fastening hole 322, and second fastening members 340 fastened to the second fastening holes 322 and the coupling holes 332.

For example, the second fastening hole 322 may be provided in an extension portion (not illustrated) extending in a transverse direction from a lower end of the second bracket 320.

The fastening part 330 may have various structures each having the coupling hole 332 corresponding to the second fastening hole 322. The present disclosure is not restricted or limited by the structure of the fastening part 330.

For example, the fastening part 330 may be made by partially cutting and bending a part of the frame member 100. In particular, a nut (not illustrated) to which the second fastening member 340 may be fastened may be integrally welded to the fastening part 330, and a nut hole of the nut may communicate with the coupling hole 332.

Since the fastening part 330 is made by partially bending a part of the frame member 100 as described above, it is possible to obtain an advantageous effect of simplifying the structure and the manufacturing process. According to another embodiment of the present disclosure, a fastening part, which is manufactured separately from the frame member, may be attached (or welded) or coupled to the frame member.

The second bracket 320 and the frame member 100 may be integrally fixed as the second fastening member 340 sequentially passes through the second fastening hole 322 and the coupling hole 332 and then is fastened to the nut welded to the fastening part 330.

A typical bolt may be used as the second fastening member 340. The present disclosure is not restricted or limited by the type and structure of the second fastening member 340.

Since the second fastening member 340 is fastened to the second fastening hole 322 and the coupling hole 332 as described above, it is possible to obtain an advantageous effect of bringing the support part 310 into closer contact with the second side part 26 and more securely fixing the arrangement state of the pressure vessel 20.

According to the exemplary embodiment of the present disclosure, the second locking part 300 may include guide slots 110 provided in the frame member 100 in the longitudinal direction of the pressure vessel 20 (the longitudinal direction of the body part 22), and guide protrusions 350 connected to the second brackets 320 and accommodated in the guide slots 110 so as to be rectilinearly movable.

An opening portion may be provided at one end of the guide slot 110, and the guide protrusion 350 may be inserted into the guide slot 110 through the opening portion of the guide slot 110.

The guide protrusion 350 may have a structure protruding from a lower end of the second bracket 320. The guide protrusion 350 is disposed to rectilinearly move along the guide slot 110.

As described above, the guide protrusion 350 connected to the second bracket 320 rectilinearly moves along the guide slot 110. Therefore, it is possible to obtain an advantageous effect of stably supporting a movement of the second bracket 320 relative to the frame member 100 (a movement in a direction in which the support part approaches the second side part) and more accurately bringing the support part 310 into close contact with the outer surface of the second side part 26 at the time of fastening the second fastening member 340 to the fastening part 330.

In particular, inclined guide portions 112 may be provided in the opening portion of the guide slot 110 and guide the insertion of the guide protrusion 350.

For example, the inclined guide portions 112 may define an inlet (an inlet through which the guide protrusion 350 is inserted into the guide slot) having a width that gradually decreases in a direction from outside to inside of the guide slot 110.

The inclined guide portion 112 may be provided in the form of a flat or curved surface. The present disclosure is not restricted or limited by the structure and shape of the inclined guide portion 112.

As described above, according to the first embodiment of the present disclosure, the inclined guide portions 112 provided in the opening portion of the guide slot 110 may allow the guide protrusion 350 to be more smoothly inserted into the guide slot 110.

In addition, according to the first embodiment of the present disclosure, the guide protrusion 350 is guided into the guide slot 110 while moving along the inclined guide portions 112, such that the guide protrusion 350 may be guided into the guide slot 110 even though the guide protrusion 350 is misaligned with the guide slot 110. Therefore, it is possible to obtain an advantageous effect of minimizing erroneous assembly of the second bracket 320, improving manufacturing efficiency, and reducing manufacturing time.

In particular, the guide slot 110 has a first width W1 in the radial direction of the pressure vessel 20, and the guide protrusion 350 has a second width W2 corresponding to the first width W1.

Since the guide slot 110 and the guide protrusion 350 have the widths corresponding to each other (W2=W1) as described above, it is possible to obtain an advantageous effect of inhibiting an abnormal rotation and an abnormal movement of the guide protrusion 350 (e.g., an abnormal movement in the radial direction of the pressure vessel) while the guide protrusion 350 moves along the guide slot 110.

More particularly, the guide slot 110 has a first thickness T1 in the upward/downward direction (based on FIG. 7), and the guide protrusion 350 has a second thickness T2 corresponding to the first thickness T1.

Since the guide slot 110 and the guide protrusion 350 have the thicknesses corresponding to each other (T1=T2) as described above, it is possible to obtain an advantageous effect of more effectively inhibiting the abnormal movement and rotation of the guide protrusion 350 while the guide protrusion 350 moves along the guide slot 110.

According to the exemplary embodiment of the present disclosure, the apparatus 10 for fixing a pressure vessel may include a locking protrusion 360 disposed at an end of the guide protrusion 350, having a larger cross-sectional area than the guide slot 110, and disposed on an outer surface of the frame member 100.

For example, the locking protrusion 360 may be provided in the form of an approximately quadrangular block having a length (a length in the radial direction of the pressure vessel 20) longer than the first width W1 of the guide slot 110. Unlike the second bracket 320 disposed on the inner surface of the frame member 100, the locking protrusion 360 may be disposed on the outer surface of the frame member 100.

As described above, the locking protrusion 360 is disposed at the end of the guide protrusion 350, and the locking protrusion 360 is supported on the outer surface (e.g., the lower surface based on FIG. 5) of the frame member 100. Therefore, it is possible to obtain an advantageous effect of inhibiting the second bracket 320 from being moved and separated from the frame member 100 in the upward/downward direction.

According to the exemplary embodiment of the present disclosure, the apparatus 10 for fixing a pressure vessel may include an elastic pad 370 disposed between the second side part 26 and the support part 310.

The elastic pad 370 may be made of an elastic material such as rubber, silicone, or urethane which is elastically deformable. The present disclosure is not restricted or limited by the material and property of the elastic pad 370.

For example, the elastic pad 370 may be provided in the form of a hollow ring corresponding to an inner surface of the support part 310.

Since the elastic pad 370 is interposed between the second side part 26 and the support part 310 as described above, the elastic pad 370 may mitigate vibration transmitted from the frame member 100 to the pressure vessel 20 when the vibration occurs (e.g., when the vibration occurs due to the operation of the vehicle). Therefore, it is possible to obtain an advantageous effect of minimizing damage to and deformation of the pressure vessel 20 and the occurrence of noise caused by the contact with the support part 310 at the time of the expansion and contraction of the pressure vessel 20.

According to the exemplary embodiment of the present disclosure, the apparatus 10 for fixing a pressure vessel may include a seating part 120 disposed on the frame member 100 and configured to allow the pressure vessel 20 to be seated thereon.

The seating part 120 may have various structures on which the pressure vessel 20 may be seated. The present disclosure is not restricted or limited by the structure of the seating part 120.

For example, the seating part 120 may include a first seating rib 122 disposed on the frame member 100 and configured to allow the body part 22 to be seated thereon, and a second seating rib 124 disposed on the frame member 100, spaced apart from the first seating rib 122, and configured to allow the body part 22 to be seated thereon.

In particular, the first seating rib 122 may include a first seating surface provided in the form of a curved surface corresponding to the outer circumferential surface of the body part 22, and the second seating rib 124 may include a second seating surface provided in the form of a curved surface corresponding to the outer circumferential surface of the body part 22. The body part 22 may be in close contact with the first seating surface and the second seating surface.

Since the outer circumferential surface of the body part 22 is seated on and in close contact with the first seating surface and the second seating surface as described above, it is possible to obtain an advantageous effect of stably maintaining a seated state of the body part 22 and minimizing an accidental movement and sway of the body part 22.

According to another embodiment of the present disclosure, the pressure vessel may be seated on only a single seating rib having a length corresponding to the length of the body part. The present disclosure is not restricted or limited by the number of seating ribs and the structure of the seating rib.

According to the exemplary embodiment of the present disclosure, the apparatus 10 for fixing a pressure vessel may include a first seating pad 126 interposed between the body part 22 and the first seating rib 122, and a second seating pad 128 interposed between the body part 22 and the second seating rib 124.

The first seating pad 126 and the second seating pad 128 may each be made of an elastic material such as rubber, silicone, or urethane which is elastically deformable. The present disclosure is not restricted or limited by the materials and properties of the first seating pad 126 and the second seating pad 128.

For example, the first seating pad 126 may have an arc-shaped cross-section corresponding to the first seating surface, and the second seating pad 128 may have an arc-shaped cross-section corresponding to the second seating surface.

Since the first seating pad 126 is interposed between the body part 22 and the first seating rib 122 and the second seating pad 128 is interposed between the body part 22 and the second seating rib 124 as described above, it is possible to mitigate vibration transmitted from the frame member 100 (the seating part) to the pressure vessel 20 when the vibration occurs. Therefore, it is possible to obtain an advantageous effect of minimizing damage to and deformation of the pressure vessel 20 and the occurrence of noise caused by the contact with the seating part 120 at the time of the expansion and contraction of the pressure vessel 20.

Referring to FIGS. 9 to 16, an apparatus 10' for fixing a pressure vessel according to a second embodiment of the present disclosure is configured to fix a pressure vessel 20' to a subject and includes: a first frame member 110' configured to be fixed to the subject; a second frame member 120' spaced apart from the first frame member 110' and configured to be fixed to the subject; a first clamp 210' including a first clamp body 212' configured to surround one part of an outer circumferential surface of the pressure vessel 20', a first connecting portion 214' disposed at one end of the first clamp body 212' and connected to the first frame member 110', and a first coupling portion 216' disposed at the other end of the first clamp body 212' and configured to be movable toward or away from one surface of the second frame member 120'; a second clamp 220' including a second clamp body 222' configured to surround the other part of the outer circumferential surface of the pressure vessel 20', a second connecting portion 224' disposed at one end of the second clamp body 222' and connected to the first frame member 110', and a second coupling portion 226' disposed at the other end of the second clamp body 222' and configured to be movable toward or away from the other surface of the second frame member 120'; and an elastic member 410' configured to elastically support the movements of the first and second coupling portions 216' and 226' relative to the second frame member 120'.

For reference, the apparatus 10' for fixing a pressure vessel according to the second embodiment of the present disclosure may be used to fix the pressure vessel 20' to various subjects. The present disclosure is not restricted or limited by the type and structure of the subject to which the pressure vessel 20' is fixed.

For example, the apparatus 10' for fixing a pressure vessel according to the second embodiment of the present disclosure may be used to fix the pressure vessel 20' in a vehicle (e.g., a passenger vehicle or a commercial vehicle).

The pressure vessel 20' may store high-pressure compressed hydrogen. For example, the pressure vessel 20' may include a liner (not illustrated), a carbon fiber layer (not illustrated) configured to surround an outer surface of the liner, and a fiberglass layer (not illustrated) configured to surround an outer surface of the carbon fiber layer. The pressure vessel 20' may be selectively expanded or contracted depending on a pressure of hydrogen stored in the pressure vessel 20'.

The first frame member 110' may be fixed to the subject (e.g., a vehicle body of a vehicle).

The first frame member 110' may be variously changed in structure and shape in accordance with required conditions and design specifications. The present disclosure is not restricted or limited by the structure and shape of the first frame member 110'.

For example, the first frame member 110' may have a bent structure including a mounting part (not illustrated) having an approximately "U"-shaped cross-section. Two opposite ends of the first frame member 110' may be fixed to the subject by typical fastening members.

The second frame member 120' is spaced apart from the first frame member 110' and fixed to the subject (e.g., the vehicle body of the vehicle). A mounting space in which the pressure vessel 20' is mounted is disposed between the first frame member 110' and the second frame member 120'.

The second frame member 120' may be variously changed in structure and shape in accordance with required conditions and design specifications. The present disclosure is not restricted or limited by the structure and shape of the second frame member 120'. In particular, the second frame member 120' may have the same structure as the first frame member 110'.

For example, the second frame member 120' may have a bent structure including a mounting part (not illustrated) having an approximately "U"-shaped cross-section. Two opposite ends of the second frame member 120' may be fixed to the subject by typical fastening members.

Figure 9:
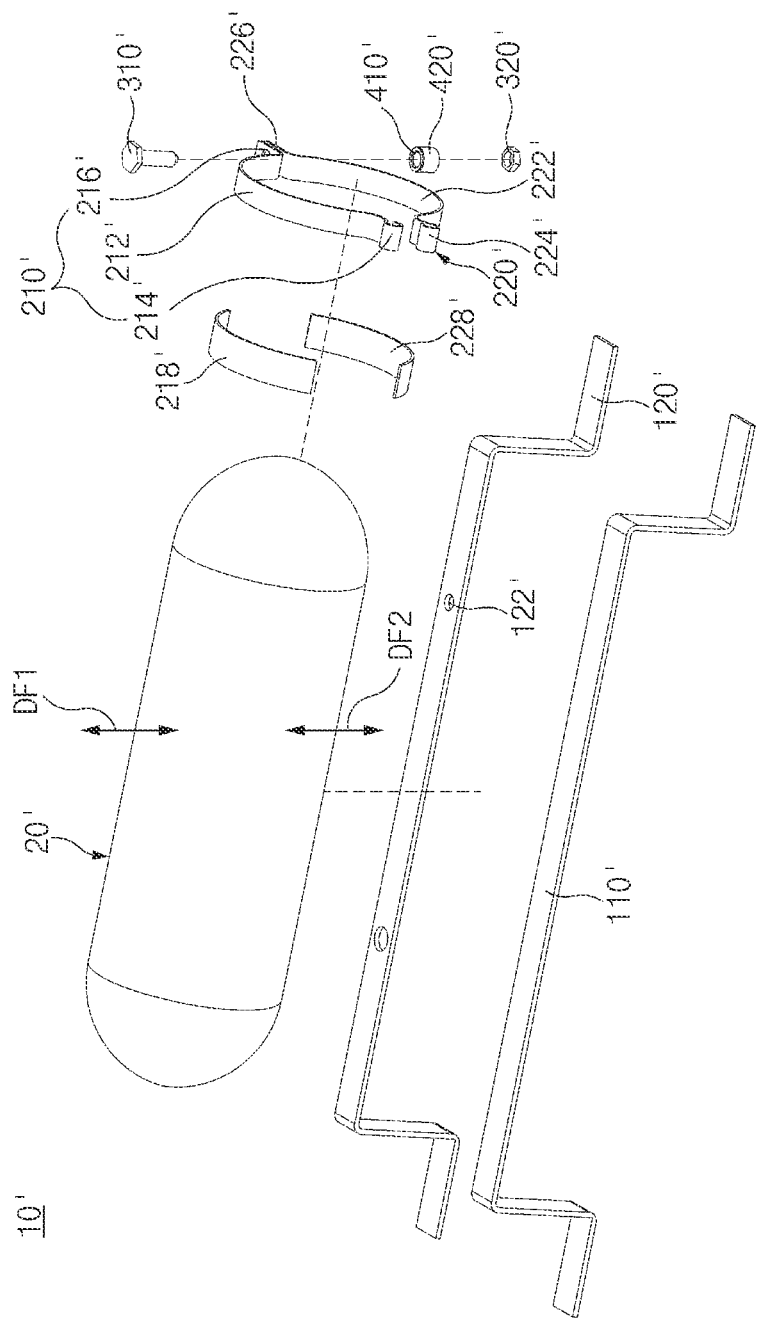
FIG. 9 is an exploded perspective view for explaining an apparatus for fixing a pressure vessel according to a second embodiment of the present disclosure.
Figure 10:
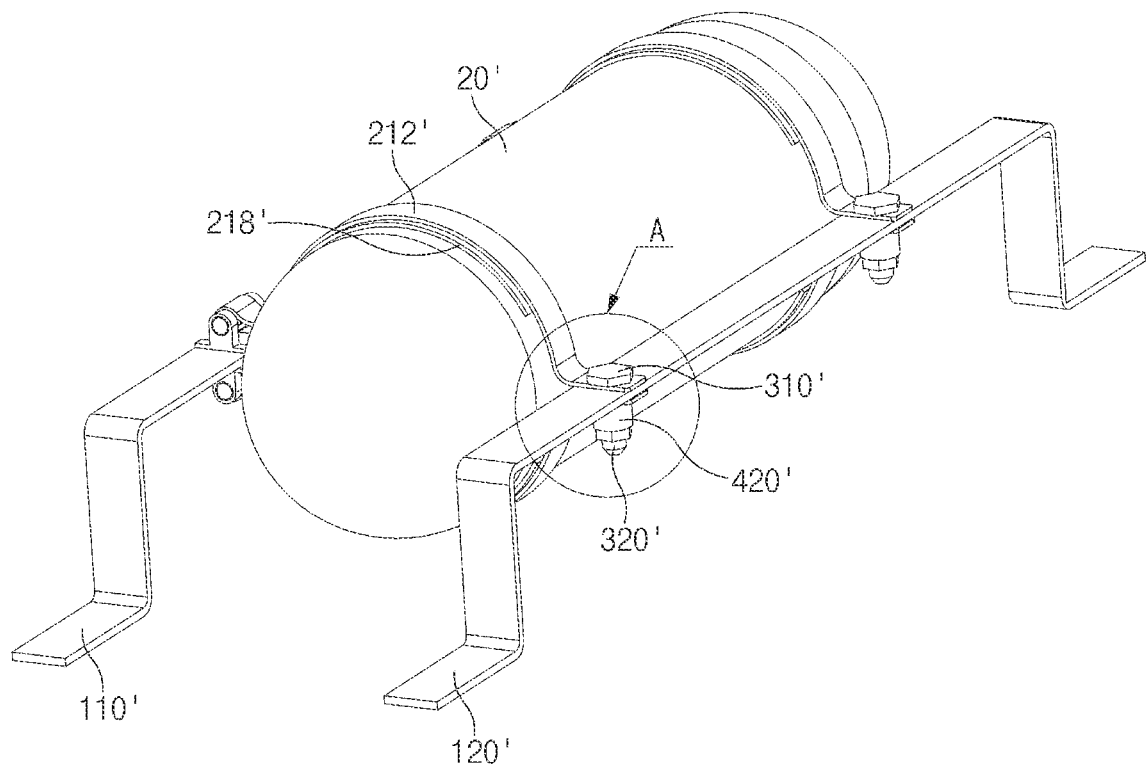
FIG. 10 is a perspective view for explaining the apparatus for fixing a pressure vessel according to the second embodiment of the present disclosure.
Figure 11:
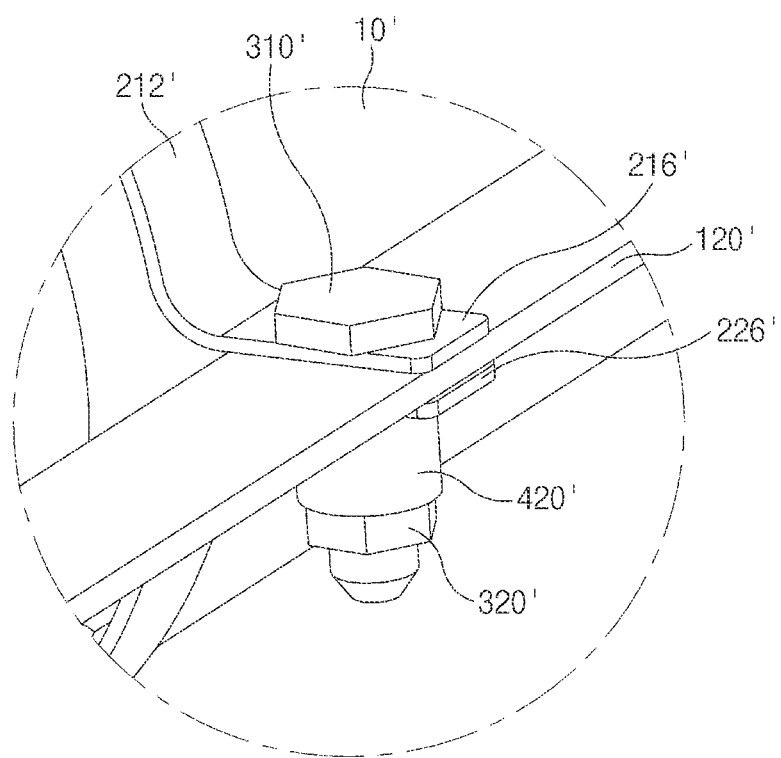
FIG. 11 is an enlarged view of part 'A' in FIG. 10.
Figure 12:
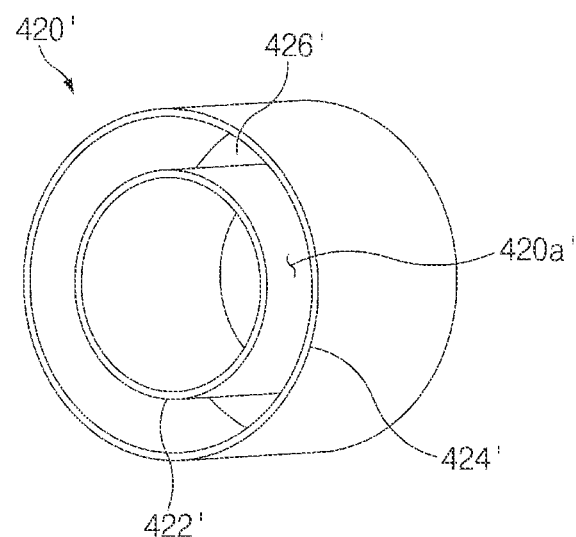
FIG. 12 is a view for explaining a support member of the apparatus for fixing a pressure vessel according to the second embodiment of the present disclosure.
Figure 13:
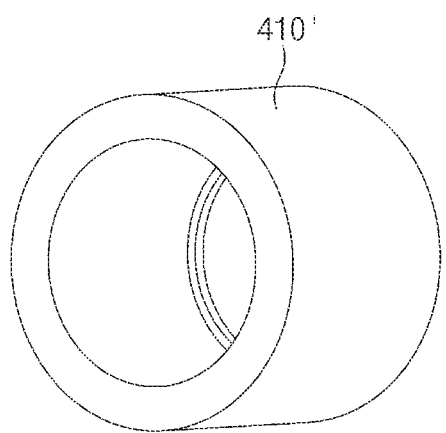
FIG. 13 is a view for explaining an elastic member of the apparatus for fixing a pressure vessel according to the second embodiment of the present disclosure.
Figure 14:
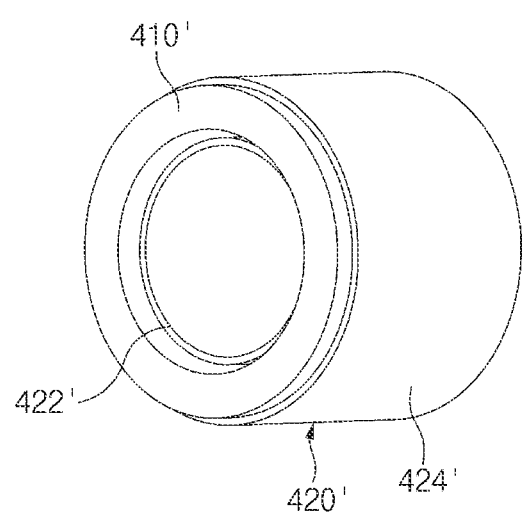
FIG. 14 is a view for explaining the elastic member accommodated in the support member of the apparatus for fixing a pressure vessel according to the second embodiment of the present disclosure.
Figure 15:
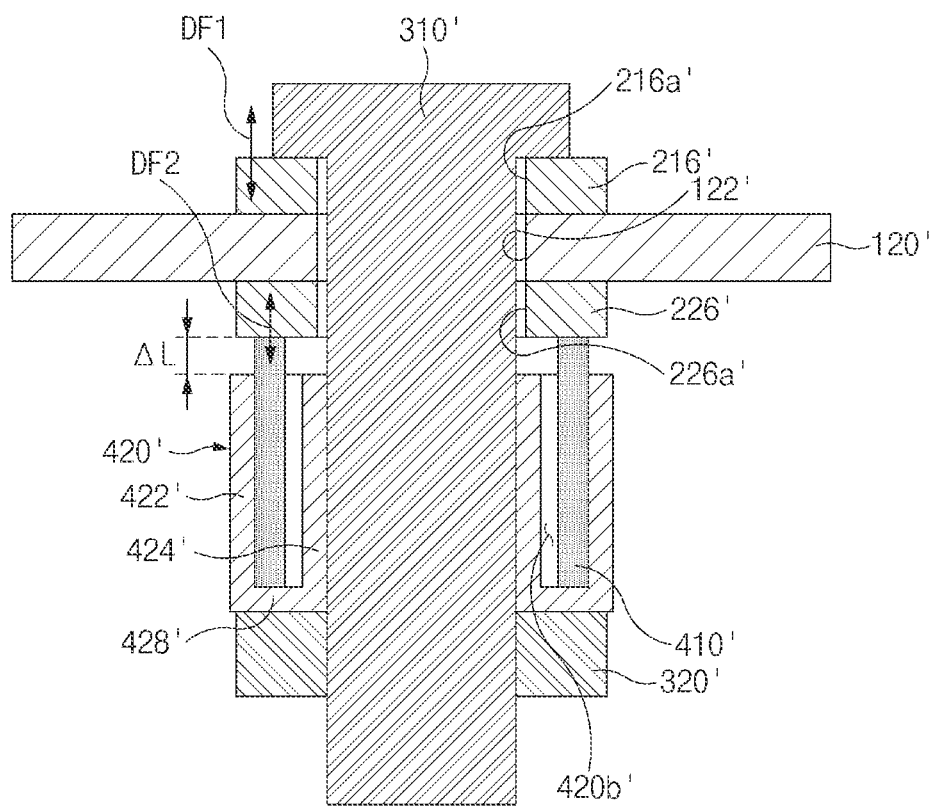
FIG. 15 is a view for explaining a first fastening member and a second fastening member of the apparatus for fixing a pressure vessel according to the second embodiment of the present disclosure.

Referring to FIGS. 9 to 11, the first clamp 210' and the second clamp 220' are configured to cooperatively fix the pressure vessel 20' to the first frame member 110' and the second frame member 120'.

The first clamp 210' and the second clamp 220' may be variously changed in number and arrangement interval in accordance with required conditions and design specifications. The present disclosure is not restricted or limited by the number of first and second clamps 210' and 220' and the arrangement interval between the first and second clamps 210' and 220'.

For example, the pressure vessel 20' may be fixed by two first clamps 210' and two second clamps 220' which are spaced apart from one another. According to another embodiment of the present disclosure, the apparatus 10' for fixing a pressure vessel may include a single first clamp 210' and a single second clamp 220' or include three or more first clamps 210' and three or more second clamps 220'.

More specifically, the first clamp 210' includes the first clamp body 212' configured to surround one part of the outer circumferential surface of the pressure vessel 20', the first connecting portion 214' disposed at one end of the first clamp body 212' and connected to the first frame member 110', and the first coupling portion 216' disposed at the other end of the first clamp body 212' and configured to be movable toward or away from one surface of the second frame member 120'.

The first clamp 210' may be variously changed in material in accordance with required conditions and design specifications. For example, the first clamp 210' may be made by continuously bending a band-shaped member made of a metallic material.

The first clamp body 212' may surround a partial section of the outer circumferential surface of the pressure vessel 20'.

For example, the first clamp body 212' is bent to have an approximately semicircular shape. The first clamp body 212' may come into close contact with and surround the outer circumferential surface of the pressure vessel 20' that corresponds to an upper section (based on FIG. 9) of the pressure vessel 20'.

According to another embodiment of the present disclosure, the first clamp body 212' may surround a lateral section or other sections of the pressure vessel 20'.

The first connecting portion 214' may be bent from and integrally connected to one end of the first clamp body 212' and connected to the first frame member 110'.

In this case, the configuration in which the first connecting portion 214' is connected to the first frame member 110' includes a case in which the first connecting portion 214' is fixed to the first frame member 110' (e.g., by bolting or riveting) or rotatably connected to the first frame member 110'.

For example, the first connecting portion 214' may be integrally connected to (or may extend from) one end of the first clamp body 212'. According to another embodiment of the present disclosure, the first connecting portion 214' may be coupled to or assembled with one end of the first clamp body 212'.

The first coupling portion 216' may be bent from and connected to the other end of the first clamp body 212' and disposed to be movable toward or away from one surface (e.g., the upper surface) of the second frame member 120'.

In this case, the configuration in which the first coupling portion 216' moves toward or away from one surface of the second frame member 120' may mean that the first coupling portion 216' moves from a position at which the first coupling portion 216' is in contact with one surface of the second frame member 120' to a position at which the first coupling portion 216' is spaced apart from one surface of the second frame member 120'. For example, the first coupling portion 216' may move toward or away from the upper surface of the second frame member 120' in the upward/downward direction.

The second clamp 220' includes the second clamp body 222' configured to surround the other part of the outer circumferential surface of the pressure vessel 20', the second connecting portion 224' disposed at one end of the second clamp body 222' and connected to the first frame member 110', and the second coupling portion 226' disposed at the other end of the second clamp body 222' and configured to be movable toward or away from one surface of the second frame member 120'.

The second clamp 220' may be variously changed in material in accordance with required conditions and design specifications. For example, the second clamp 220' may be made by continuously bending a band-shaped member made of a metallic material.

The second clamp body 222' may surround a partial section of the outer circumferential surface of the pressure vessel 20'.

For example, the second clamp body 222' is bent to have an approximately semicircular shape. The second clamp body 222' may come into close contact with and surround the outer circumferential surface of the pressure vessel 20' corresponding to a lower section (based on FIG. 9) of the pressure vessel 20'. According to another embodiment of the present disclosure, the second clamp body 222' may surround a lateral section or other sections of the pressure vessel 20'.

The second connecting portion 224' may be bent from and integrally connected to one end of the second clamp body 222' and connected to the first frame member 110'.

In this case, the configuration in which the second connecting portion 224' is connected to the first frame member 110' includes a case in which the second connecting portion 224' is fixed or rotatably connected to the first frame member 110'.

For example, the second connecting portion 224' may be integrally connected to (or may extend from) one end of the second clamp body 222'. According to another embodiment of the present disclosure, the second connecting portion 224' may be coupled to or assembled with one end of the second clamp body 222'.

The second coupling portion 226' may be bent from and connected to the other end of the second clamp body 222' and disposed to be movable toward or away from the other surface (e.g., the lower surface) of the second frame member 120'.

In this case, the configuration in which the second coupling portion 226' moves toward or away from the other surface of the second frame member 120' may mean that the second coupling portion 226' moves from a position at which the second coupling portion 226' is in contact with the other surface of the second frame member 120' to a position at which the second coupling portion 226' is spaced apart from the other surface of the second frame member 120'. For example, the second coupling portion 226' may move toward or away from the lower surface of the second frame member 120' in the upward/downward direction.

Referring to FIGS. 12 to 15, the elastic member 410' elastically supports the movements of the first and second coupling portions 216' and 226' relative to the second frame member 120'.

The elastic member 410' may have various structures capable of elastically supporting the movements of the first and second coupling portions 216' and 226' relative to the second frame member 120'. The present disclosure is not restricted or limited by the type and arrangement structure of the elastic member 410'. For example, the elastic member 410' may have a hollow cylindrical shape.

According to the exemplary embodiment of the present disclosure, the apparatus 10' for fixing a pressure vessel may include a first fastening member 310' configured to penetrate the first coupling portion 216', the second frame member 120', and the second coupling portion 226', and a second fastening member 320' fastened to the first fastening member 310'. The elastic member 410' may be elastically deformably interposed between the second coupling portion 226' and the second fastening member 320'.

For example, a typical bolt may be used as the first fastening member 310', and a nut may be used as the second fastening member 320'.

In particular, the apparatus 10' for fixing a pressure vessel may include a first coupling hole 216a' provided in the first coupling portion 216', a through-hole 122' provided in the second frame member 120', and a second coupling hole 226a' provided in the second coupling portion 226'. The first fastening member 310' may sequentially pass through the first coupling hole 216a', the through-hole 122', and the second coupling hole 226a' and then be fastened to the second fastening member 320'.

The elastic member 410' may be made of an elastic material which is elastically deformable (compressible). For example, the elastic member 410' may be made of one or more of rubber, silicone, and urethane which are elastically deformable.

According to another embodiment of the present disclosure, the elastic member 410' may be made of other elastic materials. The present disclosure is not restricted or limited by the type and property of the elastic member 410'. Alternatively, a spring may be used as the elastic member 410'.

As described above, according to the second embodiment of the present disclosure, the other end (first coupling portion 216') of the first clamp 210' and the other end (second coupling portion 226') of the second clamp 220' may elastically move toward or away from the second frame member 120'. For example, when the pressure vessel 20 expands, the first coupling portion 216' moves upward, and the second coupling portion 226' moves downward. Therefore, it is possible to obtain an advantageous effect of stably absorbing an upward displacement DF1 and a downward displacement DF2 caused by the expansion and contraction of the pressure vessel 20', thereby improving the safety and reliability.

Among other things, according to the second embodiment of the present disclosure, when the pressure vessel 20' expands, the first coupling portion 216' moves upward, and the second coupling portion 226' moves downward. Therefore, the expansion and contraction of the pressure vessel 20' may be guided in the upward/downward direction based on the center of the pressure vessel 20' as uniformly as possible (without being deflected). Therefore, it is possible to obtain an advantageous effect of minimizing the movement of the center of the pressure vessel 20' at the time of the expansion and contraction of the pressure vessel 20' and minimizing the distortion of the center of the pressure vessel 20' relative to the component connected to the pressure vessel 20'.

Figure 16:
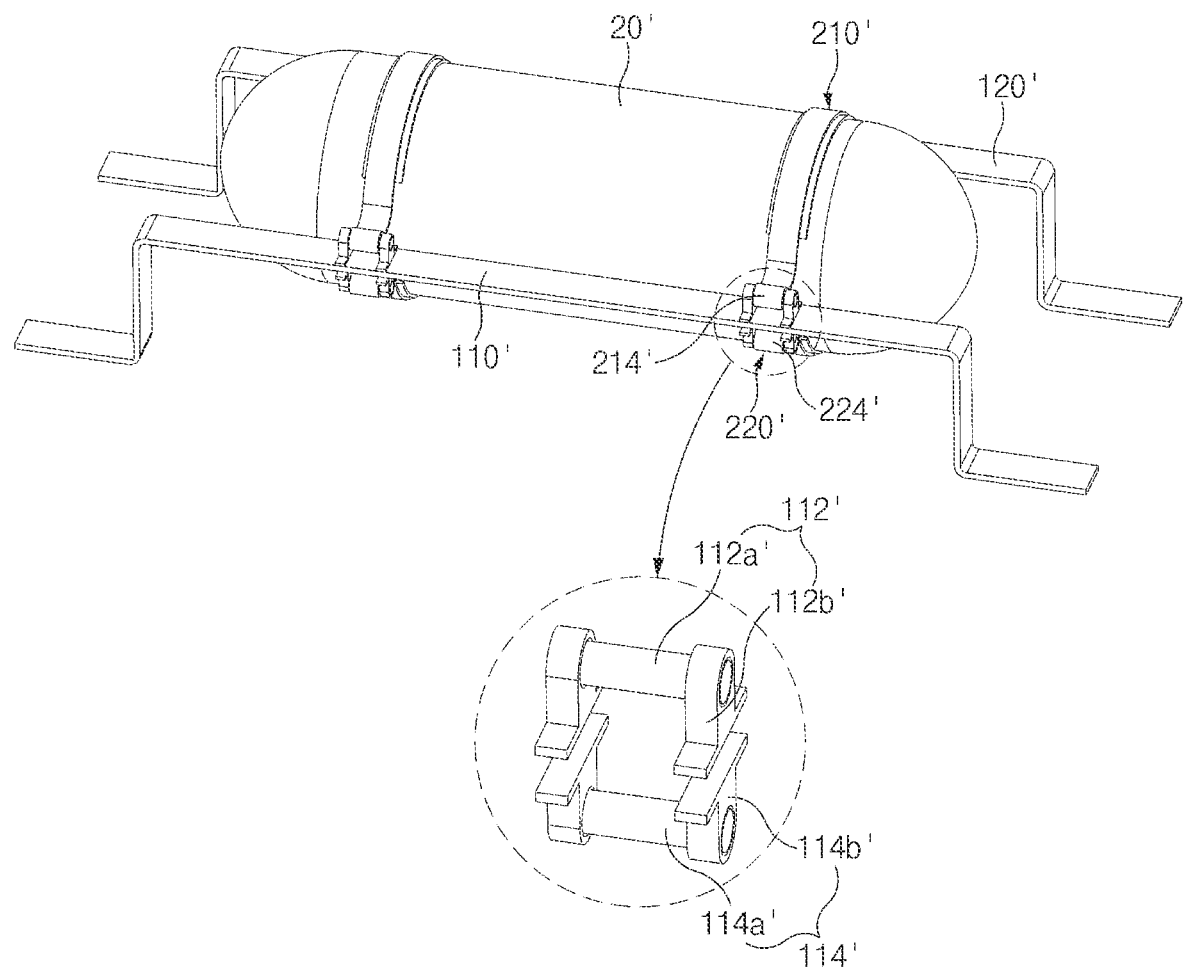
FIG. 16 is a view for explaining a first hinge part and a second hinge part of the apparatus for fixing a pressure vessel according to the second embodiment of the present disclosure.

Referring to FIG. 16, according to the exemplary embodiment of the present disclosure, the apparatus 10' for fixing a pressure vessel may include a first hinge part 112' disposed on the first frame member 110' and configured to allow the first connecting portion 214' to be rotatably connected thereto, and a second hinge part 114' disposed on the first frame member 110' and configured to allow the second connecting portion 224' to be rotatably connected thereto.

The first hinge part 112' may have various structures to which the first connecting portion 214' may be rotatably connected. The present disclosure is not restricted or limited by the structure of the first hinge part 112'.

For example, the first hinge part 112' may include a first hinge shaft 112a' connected to the first connecting portion 214', and first hinge brackets 112b' disposed on one surface (e.g., the upper surface) of the first frame member 110' and configured to support the first hinge shaft 112a' in such a manner that the first hinge shaft 112a' is rotatable.

For example, the first connecting portion 214' may be bent to surround the first hinge shaft 112a', and the first hinge shaft 112a' may be rotatably accommodated in the first connecting portion 214'.

As described above, according to the second embodiment of the present disclosure, the first connecting portion 214' is rotatably connected to the first frame member 110' by means of the first hinge part 112'. Therefore, when the pressure vessel 20' expands, the first coupling portion 216' may move away from the second frame member 120', and the first clamp 210' may rotate as a whole relative to the first frame member 110'. Therefore, it is possible to obtain an advantageous effect of more effectively absorbing the displacement caused by the expansion of the pressure vessel 20' and ensuring the uniform expansion of the pressure vessel 20'.

The second hinge part 114' may have various structures to which the second connecting portion 224' may be rotatably connected. The present disclosure is not restricted or limited by the structure of the second hinge part 114'.

For example, the second hinge part 114' may include a second hinge shaft 114a' connected to the second connecting portion 224', and second hinge brackets 114b' disposed on the other surface (e.g., the lower surface) of the first frame member 110' and configured to support the second hinge shaft 114a' in such a manner that the second hinge shaft 114a' is rotatable.

For example, the second connecting portion 224' may be bent to surround the second hinge shaft 114a', and the second hinge shaft 114a' may be rotatably accommodated in the second connecting portion 224'.

As described above, according to the second embodiment of the present disclosure, the second connecting portion 224' is rotatably connected to the first frame member 110' by means of the second hinge part 114'. Therefore, when the pressure vessel 20' expands, the second coupling portion 226' may move away from the second frame member 120', and the second clamp 220' may rotate as a whole relative to the first frame member 110'. Therefore, it is possible to obtain an advantageous effect of more effectively absorbing the displacement caused by the expansion of the pressure vessel 20' and ensuring the uniform expansion of the pressure vessel 20'.

According to the exemplary embodiment of the present disclosure, the apparatus 10' for fixing a pressure vessel may include a support member 420' interposed between the second coupling portion 226' and the second fastening member 320'.

The support member 420' may have various structures capable of supporting the elastic member 410' between the second coupling portion 226' and the second fastening member 320'. The present disclosure is not restricted or limited by the structure and shape of the support member 420'.

For example, the support member 420' has an accommodation portion 420a' that partially accommodates a part of the elastic member 410'. The remaining part of the elastic member 410' may protrude to the outside of the accommodation portion 420a' between the second coupling portion 226' and the second fastening member 320'.

As described above, a part of the elastic member 410' is accommodated in the accommodation portion 420a', and the remaining part of the elastic member 410' protrudes to the outside of the accommodation portion 420a' between the second coupling portion 226' and the second fastening member 320'. Therefore, it is possible to ensure an elastic deformation section ΔL of the elastic member 410' for absorbing the displacements DF1 and DF2 of the pressure vessel 20'.

In particular, the support member 420' may include a first support portion 422' having a first diameter, a second support portion 424' having a second diameter larger than the first diameter and configured to define the accommodation portion 420a' in cooperation with the first support portion 422', and a connecting ring portion 426' configured to connect one end of the first support portion 422' and one end of the second support portion 424'.

The first support portion 422' may have a hollow cylindrical shape having the first diameter, and the second support portion 424' may have a hollow cylindrical shape having the second diameter larger than the first diameter. The accommodation portion 420a' having an approximately ring shape may be defined between the first support portion 422' and the second support portion 424'.

More particularly, an available space 420b' may be provided between the elastic member 410' and an inner wall surface of the accommodation portion 420a'.

As described above, the available space 420b' is provided between the elastic member 410' and the inner wall surface of the accommodation portion 420a' in the state in which the elastic member 410' is accommodated in the accommodation portion 420a'. Therefore, it is possible to obtain an advantageous effect of entirely uniformly guiding the elastic deformation of the elastic member 410' and ensuring the smooth compression of the elastic member 410' when the elastic member 410' is compressed. Further, it is possible to obtain an advantageous effect of more stably maintaining the arrangement state of the elastic member 410' (the state in which the elastic member 410' supports the lower portion of the second coupling portion 226').

The support member 420' may be made of various materials in accordance with required conditions and design specifications. The present disclosure is not restricted or limited by the material of the support member 420'.

According to the exemplary embodiment of the present disclosure, the support member 420' may be made of a rigid, non-elastic material.

For example, the support member 420' may be made of one or more of plastic, engineering plastic, and metal. In some instances, the support member 420' may be made of a non-elastic material.

Since the support member 420' is made of a rigid, non-elastic material as described above, it is possible to obtain an advantageous effect of stably maintaining the arrangement state of the elastic member 410' and minimizing the deformation (e.g., torsion) of the elastic member 410' that occurs when the second fastening member 320' is fastened.

In particular, the elastic member 410' and the support member 420' may be integrated by dual-injection molding. According to another embodiment of the present disclosure, the elastic member 410' and the support member 420' may be individually manufactured, and then the elastic member 410' may be disposed in the support member 420'.

According to the exemplary embodiment of the present disclosure, the apparatus 10' for fixing a pressure vessel may include a first elastic pad 218' interposed between the pressure vessel 20' and the first clamp body 212', and a second elastic pad 228' interposed between the pressure vessel 20' and the second clamp body 222'.

For example, the first elastic pad 218' and the second elastic pad 228' may each be made of an elastic material such as rubber, silicone, or urethane.

As described above, the first elastic pad 218' is disposed between the first clamp body 212' and the outer circumferential surface of the pressure vessel 20', and the second elastic pad 228' is disposed between the second clamp body 222' and the outer circumferential surface of the pressure vessel 20'. Therefore, it is possible to obtain an advantageous effect of minimizing the occurrence of noise and minimizing the damage to and deformation of the pressure vessel 20' caused by the first clamp body 212' and the second clamp body 222' at the time of the expansion and contraction of the pressure vessel 20'.

Referring to FIGS. 17 to 23, an apparatus 10" for fixing a pressure vessel according to a third embodiment of the present disclosure is configured to fix a pressure vessel 20" to a subject and includes a frame part 100" configured to be fixed to the subject, a first clamp 210" supported on the frame part 100" and configured to surround one part of an outer circumferential surface of the pressure vessel 20", a second clamp 220" supported on the frame part 100" and configured to surround the other part of the outer circumferential surface of the pressure vessel 20", a first fastening member 310" rotatably disposed on the first clamp 210", and a second fastening member 320" connected to the second clamp 220" and fastened to the first fastening member 310" so as to be rectilinearly movable in a longitudinal direction of the first fastening member 310" in accordance with a rotation of the first fastening member 310".

For reference, the apparatus 10" for fixing a pressure vessel according to the third embodiment of the present disclosure may be used to fix the pressure vessel 20" to various subjects. The present disclosure is not restricted or limited by the type and structure of the subject to which the pressure vessel 20" is fixed.

For example, the apparatus 10" for fixing a pressure vessel according to the third embodiment of the present disclosure may be used to fix the pressure vessel 20" in a vehicle (e.g., a passenger vehicle or a commercial vehicle).

The pressure vessel 20" may store high-pressure compressed hydrogen. For example, the pressure vessel 20" may include a liner (not illustrated), a carbon fiber layer (not illustrated) configured to surround an outer surface of the liner, and a fiberglass layer (not illustrated) configured to surround an outer surface of the carbon fiber layer. The pressure vessel 20" may be selectively expanded or contracted depending on a pressure of hydrogen stored in the pressure vessel 20".

The frame part 100" is configured to fix the pressure vessel 20" to the subject (e.g., a vehicle body of a vehicle) by means of the first clamp 210" and the second clamp 220".

The frame part 100" may have various structures capable of fixing the pressure vessel 20" to the subject. The present disclosure is not restricted or limited by the structure of the frame part 100".

For example, the frame part 100" may include a first frame member 110" fixed to the subject, and a second frame member 120" spaced apart from the first frame member 110" and fixed to the subject.

The first frame member 110" may be fixed to the subject (e.g., the vehicle body of the vehicle).

The first frame member 110" may be variously changed in structure and shape in accordance with required conditions and design specifications. The present disclosure is not restricted or limited by the structure and shape of the first frame member 110".

For example, the first frame member 110" may have a bent structure including a mounting part (not illustrated) having an approximately "U"-shaped cross-section. Two opposite ends of the first frame member 110" may be fixed to the subject by typical fastening members.

The second frame member 120" is spaced apart from the first frame member 110" and fixed to the subject (e.g., the vehicle body of the vehicle). A mounting space in which the pressure vessel 20" is mounted is disposed between the first frame member 110" and the second frame member 120".

The second frame member 120" may be variously changed in structure and shape in accordance with required conditions and design specifications. The present disclosure is not restricted or limited by the structure and shape of the second frame member 120". In particular, the second frame member 120" may have the same structure as the first frame member 110".

For example, the second frame member 120" may have a bent structure including a mounting part (not illustrated) having an approximately "U"-shaped cross-section. Two opposite ends of the second frame member 120" may be fixed to the subject by typical fastening members.

Referring to FIGS. 17 to 20, the first clamp 210" and the second clamp 220" are configured to cooperatively fix the pressure vessel 20" to the first frame member 110" and the second frame member 120".

The first clamp 210" and the second clamp 220" may be variously changed in number and arrangement interval in accordance with required conditions and design specifications. The present disclosure is not restricted or limited by the number of first and second clamps 210" and 220" and the arrangement interval between the first and second clamps 210" and 220".

For example, the pressure vessel 20" may be fixed by a single first clamp 210" and a single second clamp 220". According to another embodiment of the present disclosure, the apparatus for fixing a pressure vessel may include two or more first clamps and two or more second clamps.

More specifically, the first clamp 210" may include a first clamp body 212" configured to surround one part of the outer circumferential surface of the pressure vessel 20", a first connecting portion 214" disposed at one end of the first clamp body 212" and connected to the first frame member 110", and a first extension portion 216" extending from the other end of the first clamp body 212".

The first clamp 210" may be variously changed in material in accordance with required conditions and design specifications. For example, the first clamp 210" may be made by continuously bending a band-shaped member made of a metallic material.

The first clamp body 212" may surround a partial section of the outer circumferential surface of the pressure vessel 20".

For example, the first clamp body 212" is bent to have an approximately semicircular shape. The first clamp body 212" may come into close contact with and surround the outer circumferential surface of the pressure vessel 20" that corresponds to an upper section (based on FIG. 19) of the pressure vessel 20".

According to another embodiment of the present disclosure, the first clamp body may surround a lateral section or other sections of the pressure vessel.

The first connecting portion 214" may be bent from and integrally connected to one end of the first clamp body 212" and connected to the first frame member 110".

In this case, the configuration in which the first connecting portion 214" is connected to the first frame member 110" includes a case in which the first connecting portion 214" is fixed to the first frame member 110" (e.g., by bolting or riveting) or rotatably connected to the first frame member 110".

For example, the first connecting portion 214" may be integrally connected to (or may extend from) one end of the first clamp body 212". According to another embodiment of the present disclosure, the first connecting portion may be coupled to or assembled with one end of the first clamp body.

The first extension portion 216" is bent from and integrally connected to the other end of the first clamp body 212".

The first extension portion 216" may have various structures capable of supporting the first fastening member 310" in such a manner that the first fastening member 310" is rotatable. The present disclosure is not restricted or limited by the structure of the first extension portion 216".

For example, the first extension portion 216" may integrally extend from the other end of the first clamp body 212" and protrude in a radial direction of the first clamp body 212".

The second clamp 220" includes a second clamp body 222" configured to surround the other part of the outer circumferential surface of the pressure vessel 20", a second connecting portion 224" disposed at one end of the second clamp body 222" and connected to the first frame member 110", and a second extension portion 226" extending from the other end of the second clamp body 222".

The second clamp 220" may be variously changed in material in accordance with required conditions and design specifications. For example, the second clamp 220" may be made by continuously bending a band-shaped member made of a metallic material.

The second clamp body 222" may surround a partial section of the outer circumferential surface of the pressure vessel 20".

For example, the second clamp body 222" is bent to have an approximately semicircular shape. The second clamp body 222" may come into close contact with and surround the outer circumferential surface of the pressure vessel 20" corresponding to a lower section (based on FIG. 17) of the pressure vessel 20". According to another embodiment of the present disclosure, the second clamp body may surround a lateral section or other sections of the pressure vessel.

The second connecting portion 224" may be bent from and integrally connected to one end of the second clamp body 222" and connected to the first frame member 110".

In this case, the configuration in which the second connecting portion 224" is connected to the first frame member 110" includes a case in which the second connecting portion 224" is fixed or rotatably connected to the first frame member 110".

For example, the second connecting portion 224" may be integrally connected to (or may extend from) one end of the second clamp body 222". According to another embodiment of the present disclosure, the second connecting portion may be coupled to or assembled with one end of the second clamp body.

The second extension portion 226" is bent from and integrally connected to the other end of the second clamp body 222".

The second extension portion 226" may have various structures capable of fixing (connecting) the second fastening member 320". The present disclosure is not restricted or limited by the structure of the second extension portion 226".

For example, the second extension portion 226" may integrally extend from the other end of the second clamp body 222" and protrude in a radial direction of the second clamp body 222".

The first fastening member 310" and the second fastening member 320" selectively move the first clamp 210" relative to the second clamp 220" (in a direction in which the first clamp 210" and the second clamp 220" move toward or away from each other) while imparting a fastening force by which the first clamp 210" and the second clamp 220" fasten the pressure vessel 20". Further, a distance L between the first extension portion 216" and the second extension portion 226" may vary depending on a rectilinear movement of the second fastening member 320" which is made by the rotation of the first fastening member 310".

More specifically, the first fastening member 310" is rotatably disposed on the first extension portion 216" of the first clamp 210". Further, the second fastening member 320" is connected to the second extension portion 226" of the second clamp 220" and fastened to the first fastening member 310" so as to be rectilinearly movable in the longitudinal direction of the fastening member in accordance with the rotation of the first fastening member 310".

A direction of the rectilinear movement of the second fastening member 320", which is made by the rotation of the first fastening member 310", may be variously implemented in accordance with required conditions and design specifications.

Figure 18:
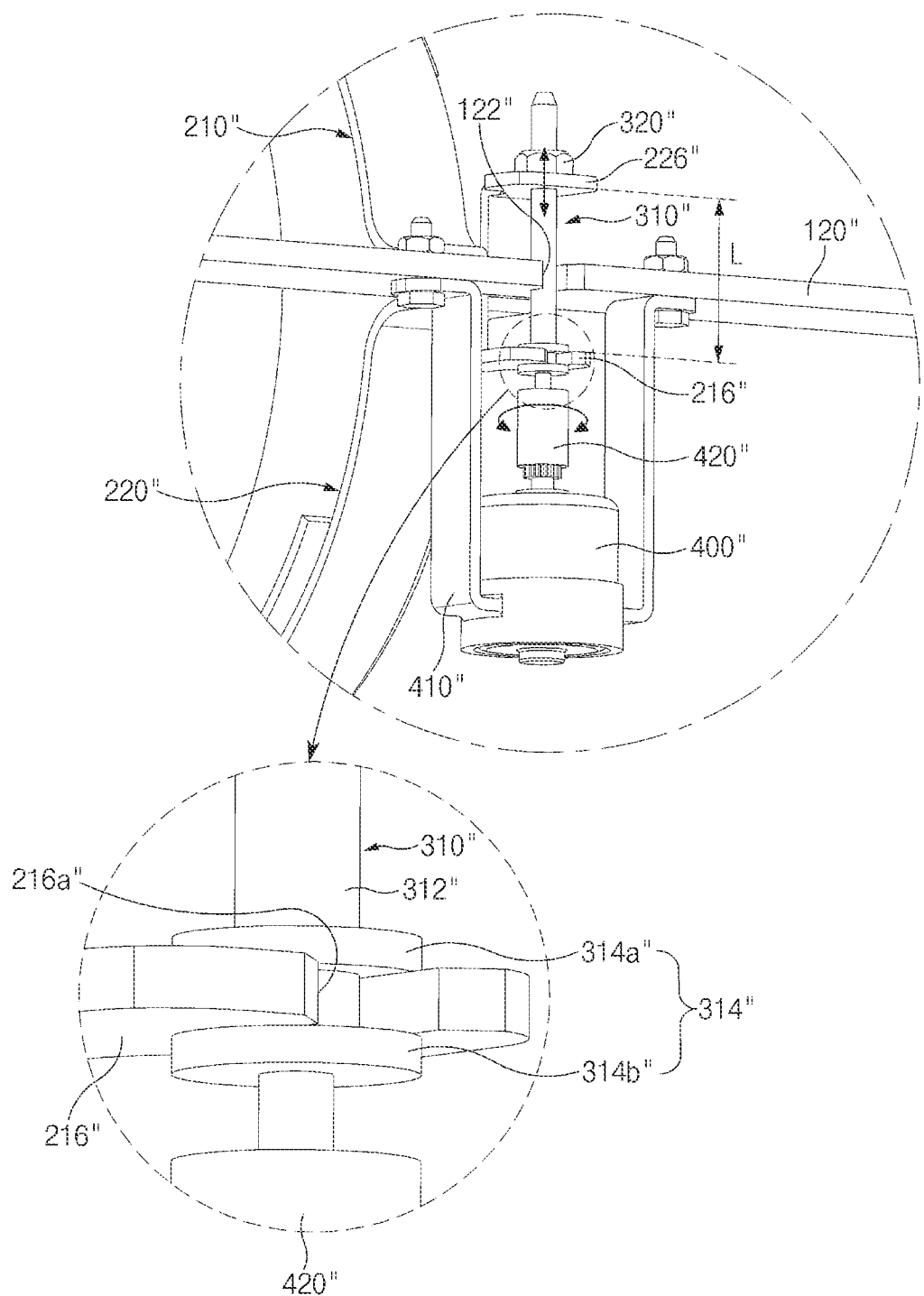
FIG. 18 is a view for explaining a structure for connecting a first clamp and a second clamp of the apparatus for fixing a pressure vessel according to the third embodiment of the present disclosure.

For example, when the first fastening member 310" rotates in a first direction (e.g., clockwise), the second extension portion 226", to which the second fastening member 320" is fixed, may move toward the first extension portion 216" (downward based on FIG. 18). On the contrary, when the first fastening member 310" rotates in a second direction (e.g., counterclockwise), the second extension portion 226", to which the fastening member is fixed, may move away from the first extension portion 216" (upward based on FIG. 18).

Various members capable of converting the rotation of the first fastening member 310" into the rectilinear motion of the second fastening member 320" may be used as the first fastening member 310" and the second fastening member 320". The present disclosure is not restricted or limited by the type and structure of the first fastening member 310" and the second fastening member 320".

For example, a typical bolt may be used as the first fastening member 310", and a nut may be used as the second fastening member 320".

According to the exemplary embodiment of the present disclosure, the first fastening member 310" may include a shaft portion 312" having a screw thread (not illustrated) provided on an outer circumferential surface thereof and configured to allow the second fastening member 320" to be thread-coupled thereto, and a support portion 314" configured to support the shaft portion 312" on the first extension portion 216".

The shaft portion 312" may be provided in the form of a straight rod having a predetermined length and a circular cross-section. The second fastening member 320" may be thread-coupled to an end of the shaft portion 312" having passed through a passing hole 226a" provided in the second extension portion 226".

The support portion 314" may have various structures capable of supporting the shaft portion 312" on the first extension portion 216". The present disclosure is not restricted or limited by the structure of the support portion 314".

For example, the support portion 314" may include a first flange 314a" disposed on the shaft portion 312", having a larger cross-sectional area (e.g., a larger diameter) than the shaft portion 312", and configured to be supported on one surface of the first extension portion 216", and a second flange 314b" disposed on the shaft portion 312", spaced apart from the first flange 314a", having a larger cross-sectional area (e.g., a larger diameter) than the shaft portion 312", and configured to be supported on the other surface of the first extension portion 216".

The first flange 314a" and the second flange 314b" may be disposed on two opposite surfaces (an upper surface and a lower surface based on FIG. 18) of the first extension portion 216" with the first extension portion 216" interposed therebetween, thereby supporting (fixing) the shaft portion 312" on the first extension portion 216".

In particular, the first extension portion 216" may have a support hole 216a" that accommodates the shaft portion 312".

More particularly, the support hole 216a" may have an inlet (i.e., an opening portion (not illustrated)) having a smaller diameter than the shaft portion 312". The shaft portion 312" may be inserted into the support hole 216a" through the inlet of the support hole 216a" in a snap-fit manner.

Since the shaft portion 312" is accommodated in the support hole 216a" as described above, it is possible to obtain an advantageous effect of inhibiting the movement (e.g., the horizontal movement based on FIG. 18) of the shaft portion 312" relative to the first extension portion 216" and more stably maintaining the arrangement state of the shaft portion 312".

Figure 21:
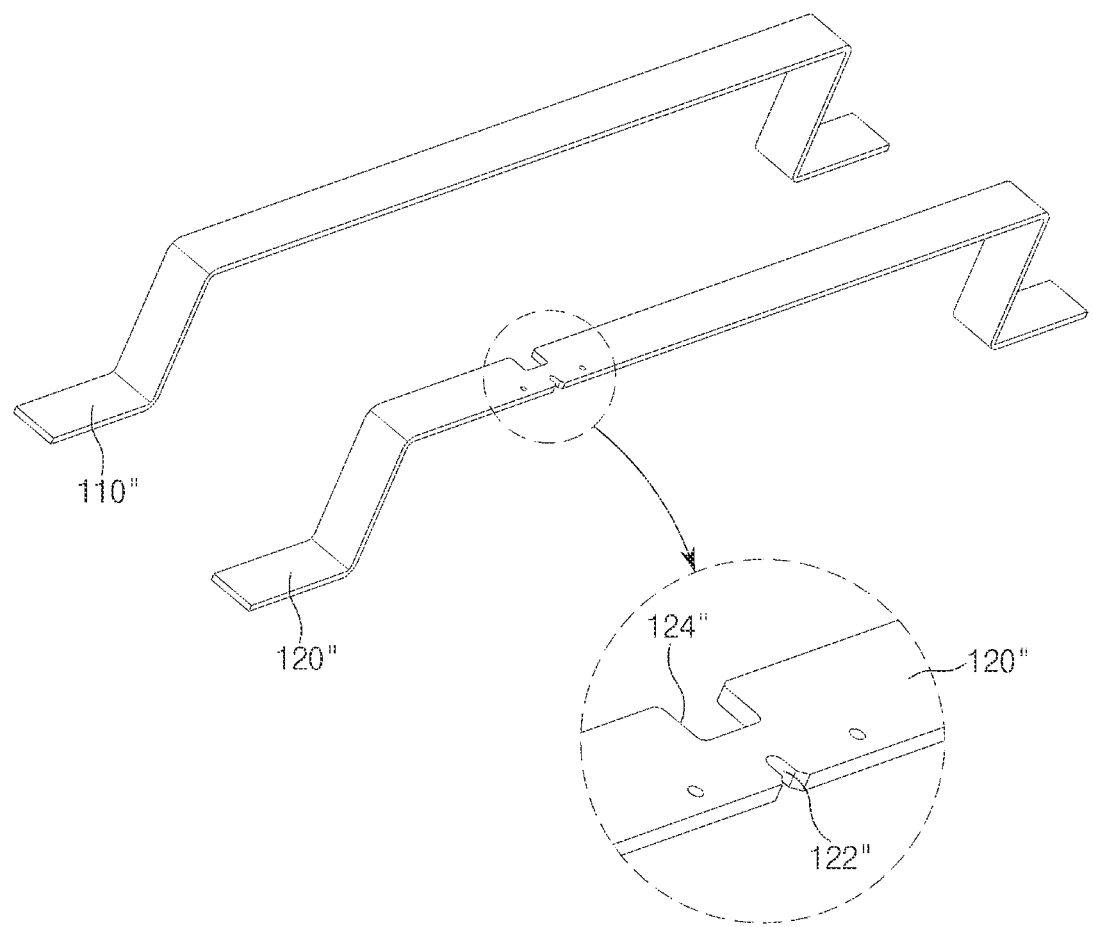
FIG. 21 is a view for explaining a frame part of the apparatus for fixing a pressure vessel according to the third embodiment of the present disclosure.

Referring to FIG. 21, according to the exemplary embodiment of the present disclosure, the apparatus 10" for fixing a pressure vessel may include a through-hole 122" configured to penetrate the frame part 100" and accommodate the shaft portion 312", and an accommodation hole 124" configured to penetrate the frame part 100" and accommodate the first clamp body 212" and the second clamp body 222".

The through-hole 122" may have various structures in accordance with required conditions and design specifications. The present disclosure is not restricted or limited by the structure and shape of the through-hole 122".

For example, the through-hole 122" may be made by partially removing a part of an outer surface of the second frame member, and the shaft portion 312" may be accommodated in the through-hole 122".

Since the through-hole 122" is provided in the second frame member and the shaft portion 312" is accommodated in the through-hole 122" as described above, the first extension portion 216" and the second extension portion 226" may not extend to a position protruding to the outside (laterally outside) of the second frame member. Therefore, it is possible to obtain an advantageous effect of further miniaturizing the first extension portion 216" and the second extension portion 226" and improving the spatial utilization and the degree of design freedom.

In addition, since the shaft portion 312" is rotatably accommodated in the through-hole 122", it is possible to obtain an advantageous effect of more stably supporting the rotation of the shaft portion 312".

The accommodation hole 124" may have various structures in accordance with required conditions and design specifications. The present disclosure is not restricted or limited by the structure and shape of the accommodation hole 124".

For example, the accommodation hole 124" may be made by partially removing a part of an inner surface of the second frame member, and the first clamp body and the second clamp body may be partially accommodated in the accommodation hole 124".

Since the second frame member has the accommodation hole 124" and the first clamp body and the second clamp body are accommodated in the accommodation hole 124" as described above, an interval between the pressure vessel 20" and the second frame member may be minimized. Therefore, it is possible to obtain an advantageous effect of bringing the second frame member into closer contact with the outer surface of the pressure vessel 20" and improving the spatial utilization and the degree of design freedom.

The second fastening member 320" may be connected to the second extension portion 226" in various ways in accordance with required conditions and design specifications. The present disclosure is not restricted or limited by the structure for connecting the second fastening member 320" and the second extension portion 226".

For example, the second fastening member 320" may be integrally fixed to the second extension portion 226" by welding. According to another embodiment of the present disclosure, the second fastening member may be coupled (or fastened) or attached to the second extension portion using a separate member.

As described above, according to the third embodiment of the present disclosure, the second fastening member 320" may rectilinearly move in the longitudinal direction of the first fastening member 310" in accordance with the rotation of the first fastening member 310", such that the first clamp 210" and the second clamp 220" may move toward or away from each other (both the first clamp and the second clamp move relative to the pressure vessel). Therefore, it is possible to obtain an advantageous effect of stably absorbing the displacement caused by the expansion and contraction of the pressure vessel 20" and improving the safety and reliability.

For example, when the pressure vessel 20" expands, the first clamp 210" may move upward (based on FIG. 19) and the second clamp 220" may move downward based on the pressure vessel 20". Therefore, it is possible to obtain an advantageous effect of stably absorbing the upward displacement DF1 and the downward displacement DF2 caused by the expansion and contraction of the pressure vessel 20" and improving the safety and reliability.

In addition, according to the third embodiment of the present disclosure, when the pressure vessel 20" expands, the first clamp 210" moves upward and the second clamp 220" moves downward based on the pressure vessel 20". Therefore, the expansion and contraction of the pressure vessel 20" may be guided in the upward/downward direction based on the center of the pressure vessel 20" as uniformly as possible (without being deflected). Therefore, it is possible to obtain an advantageous effect of minimizing the movement of the center of the pressure vessel 20" at the time of the expansion and contraction of the pressure vessel 20" and minimizing the distortion of the center of the pressure vessel 20" relative to the component connected to the pressure vessel 20".

Moreover, according to the third embodiment of the present disclosure, the second fastening member 320" may rectilinearly move in the longitudinal direction of the first fastening member 310" in accordance with the rotation of the first fastening member 310", such that the first clamp 210" and the second clamp 220" may move toward or away from each other (both the first clamp and the second clamp move relative to the pressure vessel) in accordance with the expansion and contraction of the pressure vessel 20". Therefore, it is possible to selectively adjust a fastening force implemented by the first clamp 210" and the second clamp 220".

Therefore, it is possible to adjust the fastening force, which is implemented by the first clamp 210" and the second clamp 220", based on the charge amount of hydrogen (the amount of use of hydrogen). Therefore, it is possible to obtain an advantageous effect of constantly maintaining the fastening force implemented by the first clamp 210" and the second clamp 220" and more stably maintaining the fastened state of the pressure vessel 20" regardless of the expansion and contraction of the pressure vessel 20".

Figure 22:
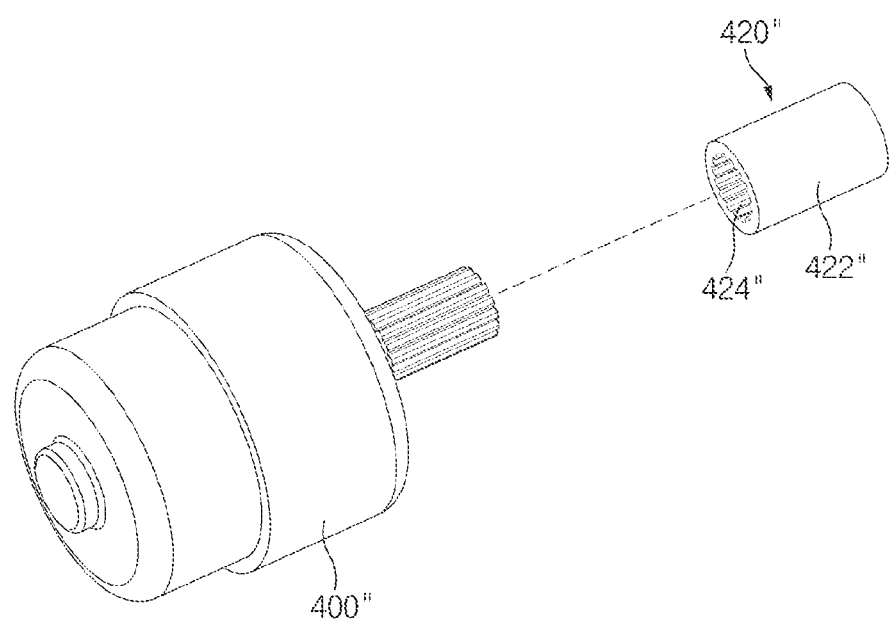
FIG. 22 is a view for explaining a drive part and a coupler of the apparatus for fixing a pressure vessel according to the third embodiment of the present disclosure.

Referring to FIGS. 18 and 22, according to the exemplary embodiment of the present disclosure, the apparatus 10" for fixing a pressure vessel may include a drive part 400" disposed on the frame part 100" and configured to provide driving power for rotating the first fastening member 310".

A typical drive means capable of providing the driving power for rotating the first fastening member 310" may be used as the drive part 400". The present disclosure is not restricted or limited by the type and structure of the drive part 400".

For example, a typical motor may be used as the drive part 400". The drive part 400" may be supported on the second frame member 120".

The drive part 400" may be supported on the second frame member 120" in various ways in accordance with required conditions and design specifications. For example, the apparatus 10" for fixing a pressure vessel may include a bracket 410" coupled to the second frame member 120". The drive part 400" may be fixed by being press-fitted into the bracket 410".

The bracket 410" may have various structures capable of fixing the drive part 400". The present disclosure is not restricted or limited by the structure of the bracket 410".

According to the exemplary embodiment of the present disclosure, the apparatus 10" for fixing a pressure vessel may include a coupler 420" configured to connect the drive part 400" and the first fastening member 310" and transmit the driving power from the drive part 400" to the first fastening member 310".

The coupler 420" may have various structures capable of transmitting the driving power of the drive part 400" to the first fastening member 310".

For example, the coupler 420" may include a coupler body 422", and a fastening hole 424" provided in the coupler body 422", having a non-circular cross-sectional shape, and having one end coupled to the first fastening member 310" and the other end coupled to the drive part 400".

For example, the fastening hole 424" may have a splined cross-sectional shape. The first fastening member 310" may be integrally coupled to one end of the fastening hole 424", and the drive part 400" (a shaft of the motor) may be integrally coupled to the other end of the fastening hole 424".

Meanwhile, according to the exemplary embodiment of the present disclosure, the apparatus 10" for fixing a pressure vessel may include a control unit (not illustrated) configured to selectively control an operation of the drive part 400".

In particular, the control unit may control the operation of the drive part 400" (e.g., control the rotation direction or rotation amount of the drive part 400") based on the charge amount of hydrogen (the amount of use of hydrogen) with which the pressure vessel 20" is charged.

For example, the control unit may be a central processing unit (CPU) or a semiconductor device that processes instructions stored in a memory and/or a storage. Examples of the memory and the storage may include various types of volatile or non-volatile storage media. Examples of the memory may include a read only memory (ROM) and a random-access memory (RAM).

Figure 23:
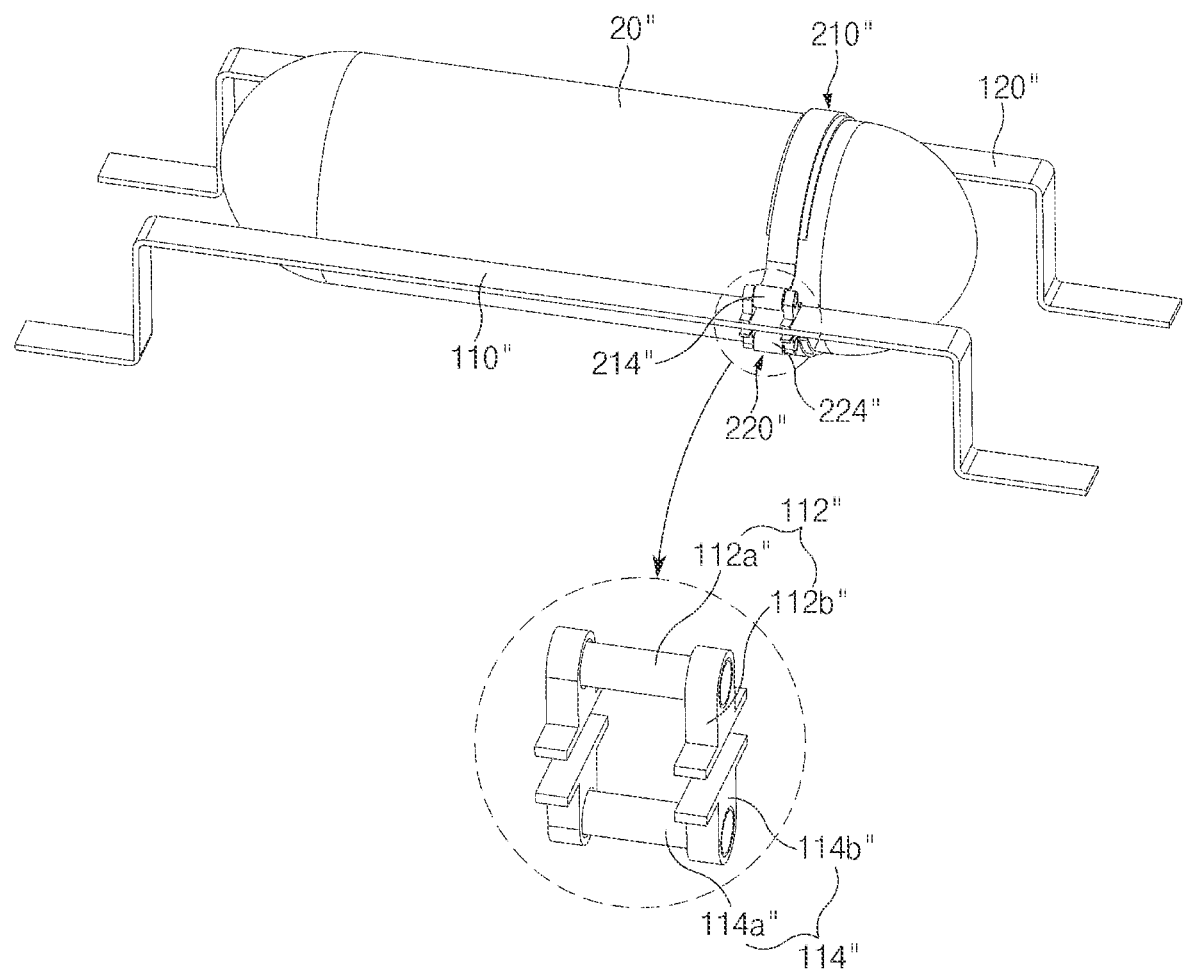
FIG. 23 is a view for explaining a first hinge part and a second hinge part of the apparatus for fixing a pressure vessel according to the third embodiment of the present disclosure.

Meanwhile, referring to FIG. 23, according to the exemplary embodiment of the present disclosure, the apparatus 10" for fixing a pressure vessel may include a first hinge part 112" disposed on the first frame member 110" and configured to allow the first connecting portion 214" to be rotatably connected thereto, and a second hinge part 114" disposed on the first frame member 110" and configured to allow the second connecting portion 224" to be rotatably connected thereto.

The first hinge part 112" may have various structures to which the first connecting portion 214" may be rotatably connected. The present disclosure is not restricted or limited by the structure of the first hinge part 112".

For example, the first hinge part 112" may include a first hinge shaft 112a" connected to the first connecting portion 214", and first hinge brackets 112b" disposed on one surface (e.g., the upper surface) of the first frame member 110" and configured to support the first hinge shaft 112a" in such a manner that the first hinge shaft 112a" is rotatable.

For example, the first connecting portion 214" may be bent to surround the first hinge shaft 112a", and the first hinge shaft 112a" may be rotatably accommodated in the first connecting portion 214".

As described above, according to the third embodiment of the present disclosure, the first connecting portion 214" is rotatably connected to the first frame member 110" by means of the first hinge part 112". Therefore, when the pressure vessel 20" expands, the first extension portion 216" may move away from the second frame member 120", and the first clamp 210" may rotate as a whole relative to the first frame member 110". Therefore, it is possible to obtain an advantageous effect of more effectively absorbing the displacement caused by the expansion of the pressure vessel 20" and ensuring the uniform expansion of the pressure vessel 20".

The second hinge part 114" may have various structures to which the second connecting portion 224" may be rotatably connected. The present disclosure is not restricted or limited by the structure of the second hinge part 114".

For example, the second hinge part 114" may include a second hinge shaft 114a" connected to the second connecting portion 224", and second hinge brackets 114b" disposed on the other surface (e.g., the lower surface) of the first frame member 110" and configured to support the second hinge shaft 114a" in such a manner that the second hinge shaft 114a" is rotatable.

For example, the second connecting portion 224" may be bent to surround the second hinge shaft 114a", and the second hinge shaft 114a" may be rotatably accommodated in the second connecting portion 224".

As described above, according to the third embodiment of the present disclosure, the second connecting portion 224" is rotatably connected to the first frame member 110" by means of the second hinge part 114". Therefore, when the pressure vessel 20" expands, the second extension portion 226" may move away from the second frame member 120", and the second clamp 220" may rotate as a whole relative to the first frame member 110". Therefore, it is possible to obtain an advantageous effect of more effectively absorbing the displacement caused by the expansion of the pressure vessel 20" and ensuring the uniform expansion of the pressure vessel 20".

Figure 17:
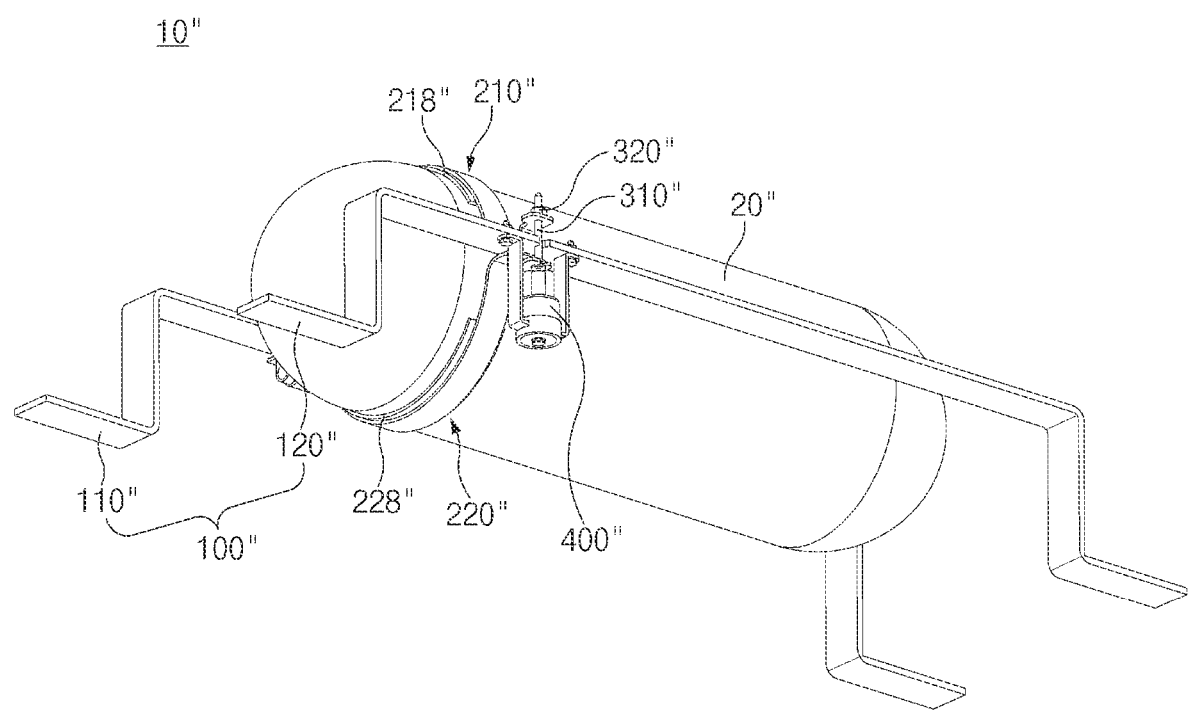
FIG. 17 is a perspective view for explaining an apparatus for fixing a pressure vessel according to a third embodiment of the present disclosure.
Figure 19:
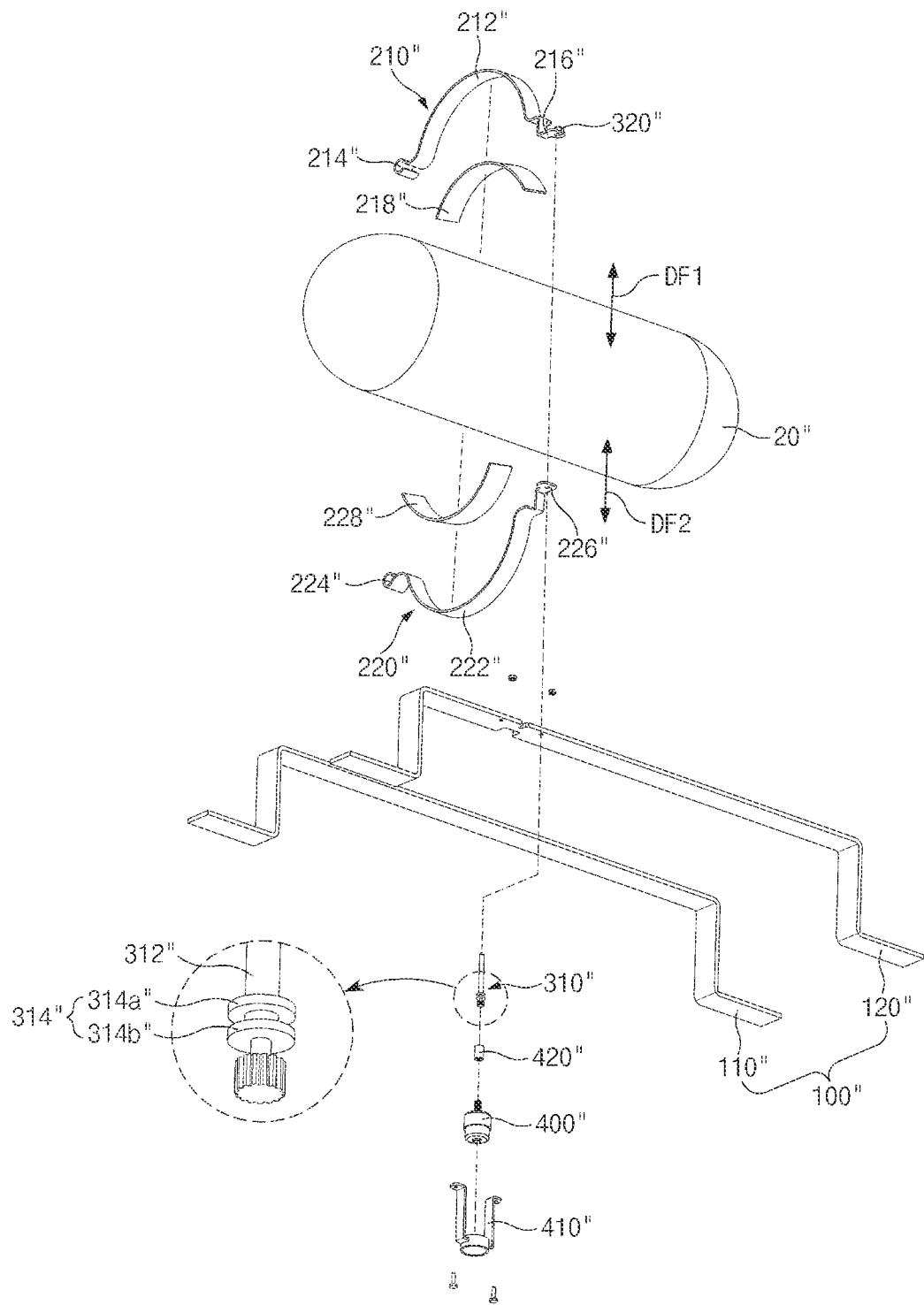
FIG. 19 is an exploded perspective view for explaining the apparatus for fixing a pressure vessel according to the third embodiment of the present disclosure.
Figure 20:
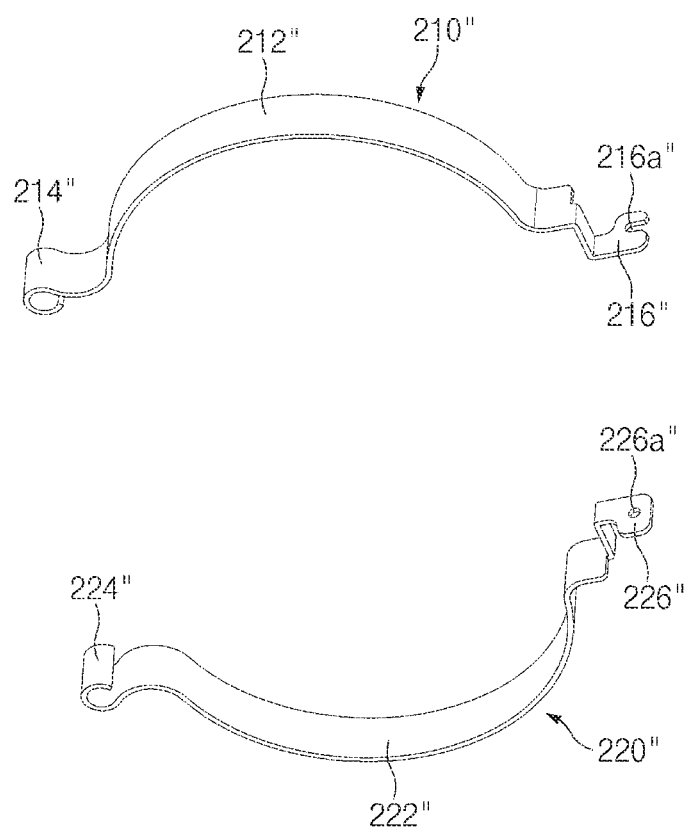
FIG. 20 is a view for explaining the first clamp and the second clamp of the apparatus for fixing a pressure vessel according to the third embodiment of the present disclosure.

In addition, referring to FIGS. 17 to 19, according to the exemplary embodiment of the present disclosure, the apparatus 10" for fixing a pressure vessel may include a first elastic pad 218" interposed between the pressure vessel 20" and the first clamp 210" (e.g., the first clamp body), and a second elastic pad 228" interposed between the pressure vessel 20" and the second clamp 220" (e.g., the second clamp body).

For example, the first elastic pad 218" and the second elastic pad 228" may each be made of an elastic material such as rubber, silicone, or urethane.

As described above, the first elastic pad 218" is disposed between the first clamp 210" and the outer circumferential surface of the pressure vessel 20", and the second elastic pad 228" is disposed between the second clamp 220" between the outer circumferential surface of the pressure vessel 20". Therefore, it is possible to obtain an advantageous effect of minimizing the occurrence of noise and minimizing the damage to and deformation of the pressure vessel 20" caused by the first clamp 210" and the second clamp 220" at the time of the expansion and contraction of the pressure vessel 20".

According to the exemplary embodiment of the present disclosure as described above, it is possible to obtain an advantageous effect of simplifying the structure and improving the degree of design freedom and spatial utilization.

In particular, according to the first embodiment of the present disclosure, it is possible to obtain an advantageous effect of reducing a height (thickness) of the structure for fixing the pressure vessel, reducing an overall height of the power pack module to which the pressure vessel is applied (i.e., reduce a thickness in a radial direction of the pressure vessel), and contributing to a reduction in size of the power pack module.

In addition, according to the first embodiment of the present disclosure, it is possible to obtain an advantageous effect of ensuring smooth expansion and contraction of the pressure vessel and uniformly guiding the expansion and contraction of the pressure vessel in all directions based on the center of the pressure vessel.

In addition, according to the first embodiment of the present disclosure, it is possible to obtain an advantageous effect of improving the structural rigidity, stability, and reliability.

In addition, according to the second embodiment of the present disclosure, it is possible to obtain an advantageous effect of stably absorbing the displacement caused by the expansion and contraction of the pressure vessel and improving the safety and reliability.

In addition, according to the second embodiment of the present disclosure, it is possible to obtain an advantageous effect of uniformly guiding the expansion and contraction of the pressure vessel in the upward/downward direction based on the center of the pressure vessel and minimizing the movement of the center of the pressure vessel at the time of the expansion and contraction of the pressure vessel.

In addition, according to the second embodiment of the present disclosure, it is possible to obtain an advantageous effect of minimizing the distortion of the center of the pressure vessel relative to the component connected to the pressure vessel.

In addition, according to the second embodiment of the present disclosure, it is possible to obtain an advantageous effect of improving the structural rigidity and durability.

According to the third embodiment of the present disclosure, it is possible to obtain an advantageous effect of stably absorbing the displacement caused by the expansion and contraction of the pressure vessel and improving the safety and reliability.

In addition, according to the third embodiment of the present disclosure, it is possible to obtain an advantageous effect of uniformly guiding the expansion and contraction of the pressure vessel in the upward/downward direction based on the center of the pressure vessel and minimizing the movement of the center of the pressure vessel at the time of the expansion and contraction of the pressure vessel.

In addition, according to the third embodiment of the present disclosure, it is possible to obtain an advantageous effect of minimizing the distortion of the center of the pressure vessel relative to the component connected to the pressure vessel.

In addition, according to the third embodiment of the present disclosure, it is possible to obtain an advantageous effect of improving the structural rigidity and durability.

In addition, according to the third embodiment of the present disclosure, it is possible to obtain an advantageous effect of stably maintaining the fastened state of the pressure vessel and constantly maintaining the fastening force implemented by the clamp regardless of the expansion and contraction of the pressure vessel.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. An apparatus for fixing a pressure vessel to an object, the apparatus comprising:
a frame member configured to be fixed to the object;
a first locking part configured to lock a first axial end of the pressure vessel to the frame member; and
a second locking part configured to lock a second axial end of the pressure vessel to the frame member,
wherein the pressure vessel comprises:
a body part;
a first side part disposed at a first end of the body part and having a dome shape; and
a second side part disposed at a second end of the body part and having a dome shape,
wherein the first side part includes a tap portion,
wherein the first locking part is configured to lock the tap portion to the frame member,
wherein the first locking part comprises:
a bracket fixed to the frame member and having a fastening hole corresponding to the tap portion; and
a fastening member fastened to the fastening hole and the tap portion, and
wherein the apparatus further comprises:
a first reference hole disposed in the frame member;
a first mounting hole disposed in the bracket and corresponding to the first reference hole;
a first fixing member fastened to the first reference hole and the first mounting hole;
a second reference hole disposed in the frame member and spaced apart from the first reference hole;
a second mounting hole provided in the bracket and corresponding to the second reference hole; and
a second fixing member fastened to the second reference hole and the second mounting hole.

2. The apparatus of claim 1,
wherein the first reference hole has a first length in a radial direction of the pressure vessel, and
wherein the second reference hole has a second length in the radial direction that is longer than the first length.

3. The apparatus of claim 1, wherein the second locking part comprises:
a support part configured to support an outer surface of the second side part; and
a bracket configured to support the support part on the frame member.

4. The apparatus of claim 3, wherein the second locking part further comprises:
a fastening hole disposed in the bracket;
a fastening part disposed on the frame member and having a coupling hole corresponding to the fastening hole; and
a fastening member fastened to the fastening hole and the coupling hole.

5. The apparatus of claim 3, wherein the support part has a form of a ring that partially surrounds the outer surface of the second side part.

6. The apparatus of claim 1, further comprising:
a seating part disposed on the frame member,
wherein the pressure vessel is seated on the seating part.

7. The apparatus of claim 6, wherein the seating part comprises:
a first seating rib disposed on the frame member and configured to allow the body part to be seated thereon; and
a second seating rib disposed on the frame member, spaced apart from the first seating rib, and configured to allow the body part to be seated thereon.

8. The apparatus of claim 7,
wherein the first seating rib comprises a first seating surface disposed in contact with an outer circumferential surface of the body part, and
wherein the second seating rib comprises a second seating surface disposed in contact with the outer circumferential surface of the body part.

9. The apparatus of claim 7, further comprising:
a first seating pad interposed between the body part and the first seating rib; and
a second seating pad interposed between the body part and the second seating rib.

10. An apparatus for fixing a pressure vessel to an object, the apparatus comprising:
a frame member configured to be fixed to the object;
a first locking part configured to lock a first axial end of the pressure vessel to the frame member; and
a second locking part configured to lock a second axial end of the pressure vessel to the frame member,
wherein the pressure vessel comprises:
a body part;
a first side part disposed at a first end of the body part and having a dome shape; and
a second side part disposed at a second end of the body part and having a dome shape,
wherein the first side part includes a tap portion,
wherein the first locking part is configured to lock the tap portion to the frame member, and
wherein the second locking part comprises:
a support part configured to support an outer surface of the second side part;
a bracket configured to support the support part on the frame member;
a guide slot disposed in the frame member in a longitudinal direction of the pressure vessel; and
a guide protrusion connected to the bracket and accommodated in the guide slot so as to be rectilinearly movable.

11. The apparatus of claim 10, further comprising:
an inclined guide portion disposed in an opening portion of the guide slot and configured to guide insertion of the guide protrusion.

12. The apparatus of claim 10,
wherein the guide slot has a first width in a radial direction of the pressure vessel, and
wherein the guide protrusion has a second width corresponding to the first width.

13. The apparatus of claim 10,
wherein the guide slot has a first thickness in an upward/downward direction, and
wherein the guide protrusion has a second thickness corresponding to the first thickness.

14. The apparatus of claim 10, further comprising:
a locking protrusion disposed at an end of the guide protrusion,
wherein the locking protrusion has a larger cross-sectional area than the guide slot, and disposed on an outer surface of the frame member.

15. An apparatus for fixing a pressure vessel to an object, the apparatus comprising:
a frame member configured to be fixed to the object;

a first locking part configured to lock a first axial end of the pressure vessel to the frame member; and a second locking part configured to lock a second axial end of the pressure vessel to the frame member;

wherein the pressure vessel comprises:
- a body part;
- a first side part disposed at a first end of the body part and having a dome shape; and
- a second side part disposed at a second end of the body part and having a dome shape, wherein the first side part includes a tap portion, wherein the first locking part is configured to lock the tap portion to the frame member, wherein the second locking part comprises:
- a support part configured to support an outer surface of the second side part; and
- a bracket configured to support the support part on the frame member, and wherein the apparatus further comprises an elastic pad interposed between the second side part and the support part.

* * * * *